(12) United States Patent
Walters, III

(10) Patent No.: US 9,916,131 B2
(45) Date of Patent: Mar. 13, 2018

(54) TECHNIQUES AND DEVICES FOR PERFORMING ARITHMETIC

(71) Applicant: The Penn State Research Foundation, University Park, PA (US)

(72) Inventor: Eugene George Walters, III, Slippery Rock, PA (US)

(73) Assignee: The Penn State Research Foundation, University Park, PA (US)

( * ) Notice: Subject to any disclaimer, the term of this patent is extended or adjusted under 35 U.S.C. 154(b) by 0 days.

(21) Appl. No.: 15/025,770

(22) PCT Filed: Oct. 2, 2014

(86) PCT No.: PCT/US2014/058803
§ 371 (c)(1),
(2) Date: Mar. 29, 2016

(87) PCT Pub. No.: WO2015/051105
PCT Pub. Date: Apr. 9, 2015

(65) Prior Publication Data
US 2016/0246571 A1    Aug. 25, 2016

Related U.S. Application Data

(60) Provisional application No. 61/885,721, filed on Oct. 2, 2013.

(51) Int. Cl.
*G06F 7/501* (2006.01)
*G06F 7/505* (2006.01)
*G06F 7/575* (2006.01)

(52) U.S. Cl.
CPC ............ *G06F 7/5057* (2013.01); *G06F 7/501* (2013.01); *G06F 7/575* (2013.01)

(58) Field of Classification Search
CPC .................. G06F 7/501; G06F 7/505–7/506
See application file for complete search history.

(56) References Cited

U.S. PATENT DOCUMENTS

| 5,481,206 A * | 1/1996 | New .................. G06F 7/503 326/38 |
| 5,754,459 A | 5/1998 | Telikepalli |
| 7,185,035 B1 * | 2/2007 | Lewis ................ G06F 7/501 708/235 |
| 7,218,139 B1 | 5/2007 | Young et al. |
| 7,274,211 B1 | 9/2007 | Simkins et al. |

(Continued)

FOREIGN PATENT DOCUMENTS

CN          103176766 A  *  6/2013

OTHER PUBLICATIONS

T. Courtney, R. Turner, R. Woods, "Multiplexer Based Reconfiguration for Virtex Multipliers", Field Programmable Logic and Applications, pp. 749-758, Aug. 2000.*

(Continued)

*Primary Examiner* — Matthew Sandifer
(74) *Attorney, Agent, or Firm* — Dinsmore & Shohl LLP

(57) ABSTRACT

A two-operand adder circuit is provided. The two-operand adder circuit may be configured to receive a bit of a second addend, a carry-in bit, and one or more bits encoding a bit of a first addend, and to provide an output representing a sum of the bit of the first addend, the bit of the second addend, and the carry-in bit.

22 Claims, 22 Drawing Sheets

(56) References Cited

U.S. PATENT DOCUMENTS

| | | |
|---|---|---|
| 7,385,416 B1 | 6/2008 | Chirania et al. |
| 7,685,215 B1 * | 3/2010 | Gaide .................... G06F 7/508 |
| | | 708/235 |
| 7,800,401 B1 | 9/2010 | Lewis et al. |
| 8,352,532 B1 | 1/2013 | Kostarnov et al. |
| 2007/0063732 A1 | 3/2007 | Kaptanoglu et al. |
| 2007/0075740 A1 | 4/2007 | Verma et al. |

OTHER PUBLICATIONS

Xilinx, "Spartan-6 FPGA Configurable Logic Block User Guide", UG384 v1.1, Feb. 2010.*

International Search Report and Written Opinion from co-pending international application No. PCT/US2014/058803, dated Dec. 23, 2014.

* cited by examiner

| column: | $2^{15}$ | $2^{14}$ | $2^{13}$ | $2^{12}$ | $2^{11}$ | $2^{10}$ | $2^9$ | $2^8$ | $2^7$ | $2^6$ | $2^5$ | $2^4$ | $2^3$ | $2^2$ | $2^1$ | $2^0$ |
|---|---|---|---|---|---|---|---|---|---|---|---|---|---|---|---|---|
| $P_0 \cdot 2^0$: | $p_{0,8}$ | $p_{0,8}$ | $p_{0,8}$ | $p_{0,8}$ | $p_{0,8}$ | $p_{0,8}$ | $p_{0,8}$ | $p_{0,7}$ | $p_{0,6}$ | $p_{0,5}$ | $p_{0,4}$ | $p_{0,3}$ | $p_{0,2}$ | $p_{0,1}$ | $p_{0,0}$ | |
| $P_1 \cdot 2^2$: | $p_{1,8}$ | $p_{1,8}$ | $p_{1,8}$ | $p_{1,8}$ | $p_{1,8}$ | $p_{1,8}$ | $p_{1,7}$ | $p_{1,6}$ | $p_{1,5}$ | $p_{1,4}$ | $p_{1,3}$ | $p_{1,2}$ | $p_{1,1}$ | $p_{1,0}$ | | $op_0$ |
| $P_2 \cdot 2^4$: | $p_{2,8}$ | $p_{2,8}$ | $p_{2,8}$ | $p_{2,8}$ | $p_{2,7}$ | $p_{2,6}$ | $p_{2,5}$ | $p_{2,4}$ | $p_{2,3}$ | $p_{2,2}$ | $p_{2,1}$ | $p_{2,0}$ | | | $op_1$ | |
| $P_3 \cdot 2^6$: | $p_{3,8}$ | $p_{3,8}$ | $p_{3,7}$ | $p_{3,6}$ | $p_{3,5}$ | $p_{3,4}$ | $p_{3,3}$ | $p_{3,2}$ | $p_{3,1}$ | $p_{3,0}$ | | | $op_2$ | | | |
| | | | | | | | | | | | | $op_3$ | | | | |

FIG. 4A

| | $2^{15}$ | $2^{14}$ | $2^{13}$ | $2^{12}$ | $2^{11}$ | $2^{10}$ | $2^9$ | $2^8$ | $2^7$ | $2^6$ | $2^5$ | $2^4$ | $2^3$ | $2^2$ | $2^1$ | $2^0$ |
|---|---|---|---|---|---|---|---|---|---|---|---|---|---|---|---|---|
| | 1 | | | 1 | | | 1 | | 1 | | | | | | | |
| $P_0 \cdot 2^0$: | 1 | 1 | 1 | 1 | 1 | 1 | 1 | $\overline{p_{0,8}}$ | $p_{0,7}$ | $p_{0,6}$ | $p_{0,5}$ | $p_{0,4}$ | $p_{0,3}$ | $p_{0,2}$ | $p_{0,1}$ | $p_{0,0}$ |
| $P_1 \cdot 2^2$: | 1 | 1 | 1 | 1 | 1 | $\overline{p_{1,8}}$ | $p_{1,7}$ | $p_{1,6}$ | $p_{1,5}$ | $p_{1,4}$ | $p_{1,3}$ | $p_{1,2}$ | $p_{1,1}$ | $p_{1,0}$ | | $op_0$ |
| $P_2 \cdot 2^4$: | 1 | 1 | 1 | $\overline{p_{2,8}}$ | $p_{2,7}$ | $p_{2,6}$ | $p_{2,5}$ | $p_{2,4}$ | $p_{2,3}$ | $p_{2,2}$ | $p_{2,1}$ | $p_{2,0}$ | | | $op_1$ | |
| $P_3 \cdot 2^6$: | 1 | $\overline{p_{3,8}}$ | $p_{3,7}$ | $p_{3,6}$ | $p_{3,5}$ | $p_{3,4}$ | $p_{3,3}$ | $p_{3,2}$ | $p_{3,1}$ | $p_{3,0}$ | | | $op_2$ | | | |
| | | | | | | | | | | | | | $op_3$ | | | |

FIG. 4B

| | $2^{15}$ | $2^{14}$ | $2^{13}$ | $2^{12}$ | $2^{11}$ | $2^{10}$ | $2^9$ | $2^8$ | $2^7$ | $2^6$ | $2^5$ | $2^4$ | $2^3$ | $2^2$ | $2^1$ | $2^0$ |
|---|---|---|---|---|---|---|---|---|---|---|---|---|---|---|---|---|
| | | | | | | | 1 | | | | | | | | | |
| $P_0 \cdot 2^0$: | | | | | | | 1 | $\overline{p_{0,8}}$ | $p_{0,7}$ | $p_{0,6}$ | $p_{0,5}$ | $p_{0,4}$ | $p_{0,3}$ | $p_{0,2}$ | $p_{0,1}$ | $p_{0,0}$ |
| $P_1 \cdot 2^2$: | | | | | | 1 | $\overline{p_{1,8}}$ | $p_{1,7}$ | $p_{1,6}$ | $p_{1,5}$ | $p_{1,4}$ | $p_{1,3}$ | $p_{1,2}$ | $p_{1,1}$ | $p_{1,0}$ | $op_0$ |
| $P_2 \cdot 2^4$: | | | | | 1 | $\overline{p_{2,8}}$ | $p_{2,7}$ | $p_{2,6}$ | $p_{2,5}$ | $p_{2,4}$ | $p_{2,3}$ | $p_{2,2}$ | $p_{2,1}$ | $p_{2,0}$ | $op_1$ | |
| $P_3 \cdot 2^6$: | | | | 1 | $\overline{p_{3,8}}$ | $p_{3,7}$ | $p_{3,6}$ | $p_{3,5}$ | $p_{3,4}$ | $p_{3,3}$ | $p_{3,2}$ | $p_{3,1}$ | $p_{3,0}$ | $op_2$ | | |
| | | | | | | | | | | | | | $op_3$ | | | |

TECHNIQUES AND DEVICES FOR PERFORMING ARITHMETIC

CROSS REFERENCE TO RELATED APPLICATIONS

This application is the U.S. national phase of PCT/US2014/058803, filed Oct. 2, 2014, and claims the benefit of U.S. provisional patent application Ser. No. 61/885,721, filed Oct. 2, 2013, and titled, "Techniques and Devices for Performing Arithmetic," each of which are incorporated herein by reference.

BACKGROUND

Field

The present application relates to techniques and devices for performing arithmetic. Some embodiments disclosed in the application relate particularly to techniques and devices for performing arithmetic using programmable logic devices.

Related Art

Computing devices are sometimes used to perform computationally-intensive tasks, including, without limitation, digital signal processing (DSP), video processing, and/or image processing. In many tasks, including many computationally-intensive tasks, a significant portion of a computing device's processing resources are used to perform addition and/or multiplication operations.

Programmable logic devices are logic devices which can be programmed to perform different operations. The field programmable gate array (FPGA) is one example of a programmable logic device. FPGAs may be used to perform digital signal processing, video processing, image processing, encryption/decryption, floating-point operations and/or other tasks, including other computationally intensive tasks. Specific examples of such tasks include radar, high-definition television, facial recognition, and others. These tasks may use Finite-Impulse Response (FIR) and Infinite-Impulse Response (IIR) filters, the Fast Fourier Transform (FFT), the Discrete Cosine Transform (DCT), wavelet transforms, etc., which may include a large number of multiply and/or accumulate operations. Multiply operations may be performed using multiplier devices. Accumulation operations may be performed using adder devices. Some FPGAs include embedded adders and/or multipliers that are not programmable. Some FPGAs can be programmed to implement one or more adders and/or multipliers using the FPGA's lookup tables (LUTs). In some circumstances, the flexibility of LUT-based adders and/or multipliers may be advantageous.

U.S. Pat. Nos. 5,754,459 and 8,352,532 describe multipliers for FPGAs.

BRIEF DESCRIPTION OF THE DRAWINGS

Various aspects and embodiments of the technology will be described with reference to the following figures. It should be appreciated that the figures are not necessarily drawn to scale. Items appearing in multiple figures are indicated by the same or similar reference number in all the figures in which they appear.

FIG. 4A illustrates an example of a matrix of partial products with basic sign extension;

FIG. 4B illustrates an example of a matrix of partial products with efficient sign extension;

FIG. 4C illustrates an example of a simplified matrix of partial products;

FIG. 21 is a dot diagram of an 8-bit by 8-bit constant coefficient multiplier (KCM), according to some embodiments;

Figure 1:
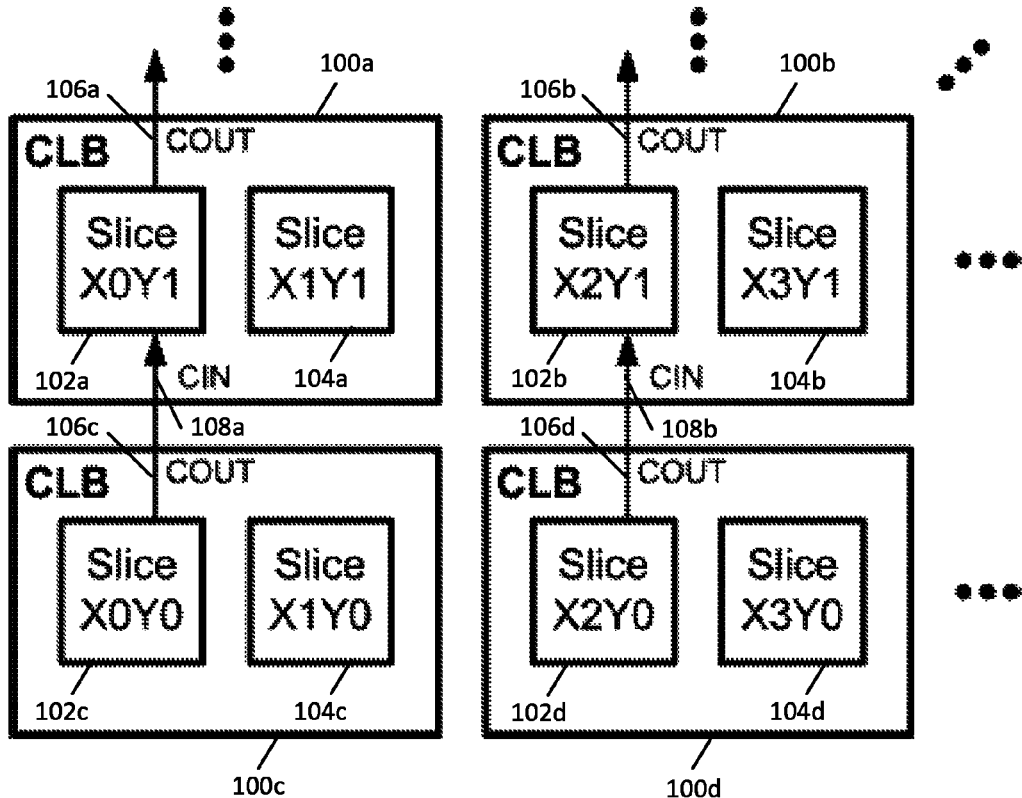
FIG. 1 is a schematic of an example of configurable logic blocks (CLBs) of an FPGA.

SUMMARY (1) According to an aspect of the present disclosure, a device is provided, comprising a producer circuit and an adder circuit. The producer circuit is configured to: receive one or more bits encoding a first addend, receive a bit of a second addend, produce, using at least one of the one or more bits encoding the first addend, a bit of the first addend, provide, at a first output, a result equal to an exclusive-OR of the bit of the first addend and the bit of the second addend, and provide, at a second output, the bit of the first addend or the bit of the second addend. The adder circuit has a first input coupled to the first output of the producer circuit, has a second input coupled to the second output of the producer circuit, has a third input coupled to receive a carry-in bit, and is configured to provide a result equal to a sum of the bit of the first addend, the bit of the second addend, and the carry-in bit.

(2) In some embodiments, the producer circuit includes: a first programmable logic circuit (PLC) having an output configured to provide the bit of the first addend; a second programmable logic circuit (PLC) having an output configured to provide an inverse of the bit of the first addend; and a first selection circuit having a first data input coupled to the output of the first PLC, a second data input coupled to the output of the second PLC, a control input coupled to receive the bit of the second addend, and an output configured to provide the result equal to the exclusive-OR of the bit of the first addend and the bit of the second addend.

(3) In some embodiments, the adder circuit includes: a second selection circuit having a first data input coupled to the output of the first PLC, a second data input coupled to receive the carry-in bit, a control input coupled to the output of first selection circuit, and an output configured to provide a result equal to a carry-out bit of a sum of the bit of the first addend, the bit of the second addend, and the carry-in bit; and a sum-bit circuit having a first input coupled to the output of the first selection circuit, a second input coupled to receive the carry-in bit, and an output configured to provide a result equal to a sum bit of the sum of the bit of the first addend, the bit of the second addend, and the carry-in bit.

(4) In some embodiments, the device is implemented on a field-programmable gate array (FPGA).

(5) According to another aspect of the present disclosure, a two-operand adder circuit is provided, comprising: a first programmable logic circuit (PLC) having an output configured to provide a bit of a first addend; a second programmable logic circuit (PLC) having an output configured to provide an inverse of the bit of the first addend; a first selection circuit having a first data input coupled to the output of the first PLC, a second data input coupled to the output of the second PLC, a control input coupled to receive a bit of a second addend, and an output configured to provide a result equal to an exclusive-OR of the bit of the first addend and the bit of the second addend; a second selection circuit having a first data input coupled to the output of the first PLC, a second data input coupled to receive a carry-in bit, a control input coupled to the output of first selection circuit, and an output configured to provide a result equal to a carry-out bit of a sum of the bit of the first addend, the bit of the second addend, and the carry-in bit; and a sum-bit circuit having a first input coupled to the output of the first selection circuit, a second input coupled to receive the carry-in bit, and an output configured to provide a result equal to a sum bit of a sum of the bit of the first addend, the bit of the second addend, and the carry-in bit.

(6) In some embodiments, inputs of the first PLC are coupled to respective inputs of the second PLC.

(7) In some embodiments, the two-operand adder circuit comprises a third programmable logic circuit (PLC), the third PLC includes: the first PLC, the second PLC, and the first selection circuit, a first output of the third PLC is coupled to the output of the first selection circuit, a second output of the third PLC is coupled to the output of the first PLC, first inputs of the third PLC are coupled to respective inputs of the first PLC and to respective inputs of the second PLC, and a second input of the third PLC is coupled to the control input of the first selection circuit.

(8) In some embodiments, the first PLC comprises a five-input lookup table (LUT), and wherein the second PLC comprises a five-input lookup table (LUT).

(9) In some embodiments, the first PLC, the second PLC, and the first selection circuit are configured to operate as a six-input lookup table (LUT).

(10) In some embodiments, the first selection circuit comprises a multiplexer.

(11) In some embodiments, the second selection circuit comprises a multiplexer.

(12) In some embodiments, the sum-bit circuit comprises an exclusive-OR gate.

(13) In some embodiments, the two-operand adder circuit further comprises a third selection circuit having a first data input coupled to the output of the first PLC, a second data input, a control input, and an output coupled to the first data input of the second selection circuit.

(14) In some embodiments, the third selection circuit comprises a multiplexer.

(15) In some embodiments, the second data input of the third selection circuit is coupled to receive the bit of the second addend.

(16) In some embodiments, the first addend comprises a first partial product, and the second addend comprises a second partial product.

(17) In some embodiments, the first partial product comprises a partial product of a radix-4 modified-Booth multiplication operation, and the second partial product comprises a partial product of a radix-4 modified-Booth multiplication operation.

(18) In some embodiments, the two-operand adder circuit further comprises a fourth programmable logic circuit (PLC) configured to provide the bit of the second addend at an output of the fourth PLC, wherein the control input of the first selection circuit is coupled to the output of the fourth PLC.

(19) In some embodiments, the inputs of the first and second PLCs are coupled to receive one or more bits of a first operand of a multiplication operation and one or more bits of a second operand of a multiplication operation.

(20) In some embodiments, a field-programmable gate array (FPGA) comprises the two-operand adder circuit.

(21) According to another aspect of the present disclosure, a device is provided, comprising: a first two-operand adder circuit as in any of (5) to (19); and a second two-operand adder circuit as in any of (5) to (19), wherein the second data input of the second selection circuit of the second two-operand adder circuit is coupled to the output of the second selection circuit of the first two-operand adder circuit.

(22) In some embodiments, a field-programmable gate array (FPGA) comprises the device.

DETAILED DESCRIPTION

Field-programmable gate arrays (FPGAs) may be used for computationally-intensive applications such as digital signal processing (DSP), video processing and image processing. For these applications and others, multiplication may be the dominant operation in terms of required resources, delay and power consumption. For this reason, many contemporary FPGAs have embedded multipliers distributed throughout the fabric. Even so, soft multipliers based on look-up tables (LUTs) remain important for high-performance designs for several reasons: (1) Embedded multiplier operands are typically fixed in size and type, such as 25×18 two's complement, while LUT-based multiplier operands can be any size or type; (2) The number of embedded multipliers is fixed, while the number of LUT-based multipliers may be limited only by the size of the reconfigurable fabric; (3) The location of embedded multipliers is fixed, while LUT-based multipliers may be placed anywhere in the fabric to improve partitioning and routing; (4) Embedded multipliers cannot be modified, while LUT-based multipliers may use techniques such as merged arithmetic and/or approximate arithmetic to optimize the overall system; and (5) LUT-based multipliers may be used in conjunction with embedded multipliers to form larger multipliers.

Techniques disclosed herein may be used to increase the performance of arithmetic circuits (e.g., by reducing the resources needed to perform a given type of computation at a given rate, and/or by increasing the rate at which a given type of computation is performed using a given set of resources). In some embodiments, 6-input LUTs may be used to form a two-operand adder structure, a ternary adder, a 4:2 compressor, a generate-add structure, and/or a multiplier. These structures may use fewer resources and provide better performance than conventional, LUT-based arithmetic structures. In some embodiments, 6-input LUTs may be used to form a two's-complement parallel-tree multiplier. Partial-product generation for the parallel-tree multiplier may be based on radix-4 modified-Booth recoding. These multipliers may use significantly fewer resources and be faster than Xilinx LogiCORE IP multipliers generated using the CORE Generator system.

I. FPGA-Based Adders and Multipliers

This section describes architectural details of the Xilinx Spartan-6 family, Virtex-5 family, Virtex-6 family, and 7 Series FPGAs which include the Artix-7, Kintex-7, and Virtex-7 families. In some embodiments, circuits for addition and/or multiplication (e.g., radix-4 modified-Booth multipliers) may be implemented using portions of FPGAs.

A. Configurable Logic Blocks

The main resource for implementing custom logic in Xilinx FPGAs is the Configurable Logic Block (CLB). FIG. 1 is a schematic of an example of CLBs of an FPGA. In particular, FIG. 1 illustrates an arrangement of slices (102, 104) within Spartan-6 family CLBs 100. In the example of FIG. 1, each CLB 100 contains two slices (102, 104). Slices (102, 104) are designated as X(col)Y(row), where 'col' denotes the column coordinate and 'row' denotes the row coordinate. In the example of FIG. 1, slice X0Y0 is located at the lower left of the logic fabric. In the Spartan-6 family, slices in even numbered columns contain fast carry logic. In Virtex-5 family, Virtex-6 family, and 7 Series FPGAs all columns have fast carry logic. The carry out 106 of each slice X(i)Y(j) is connected to the carry in 108 to slice X(i)Y(j+1) for even values of 'i' in the Spartan-6 family and for all 'i' in the Virtex-5 family, Virtex-6 family, and 7 Series FPGAs.

Figure 2:
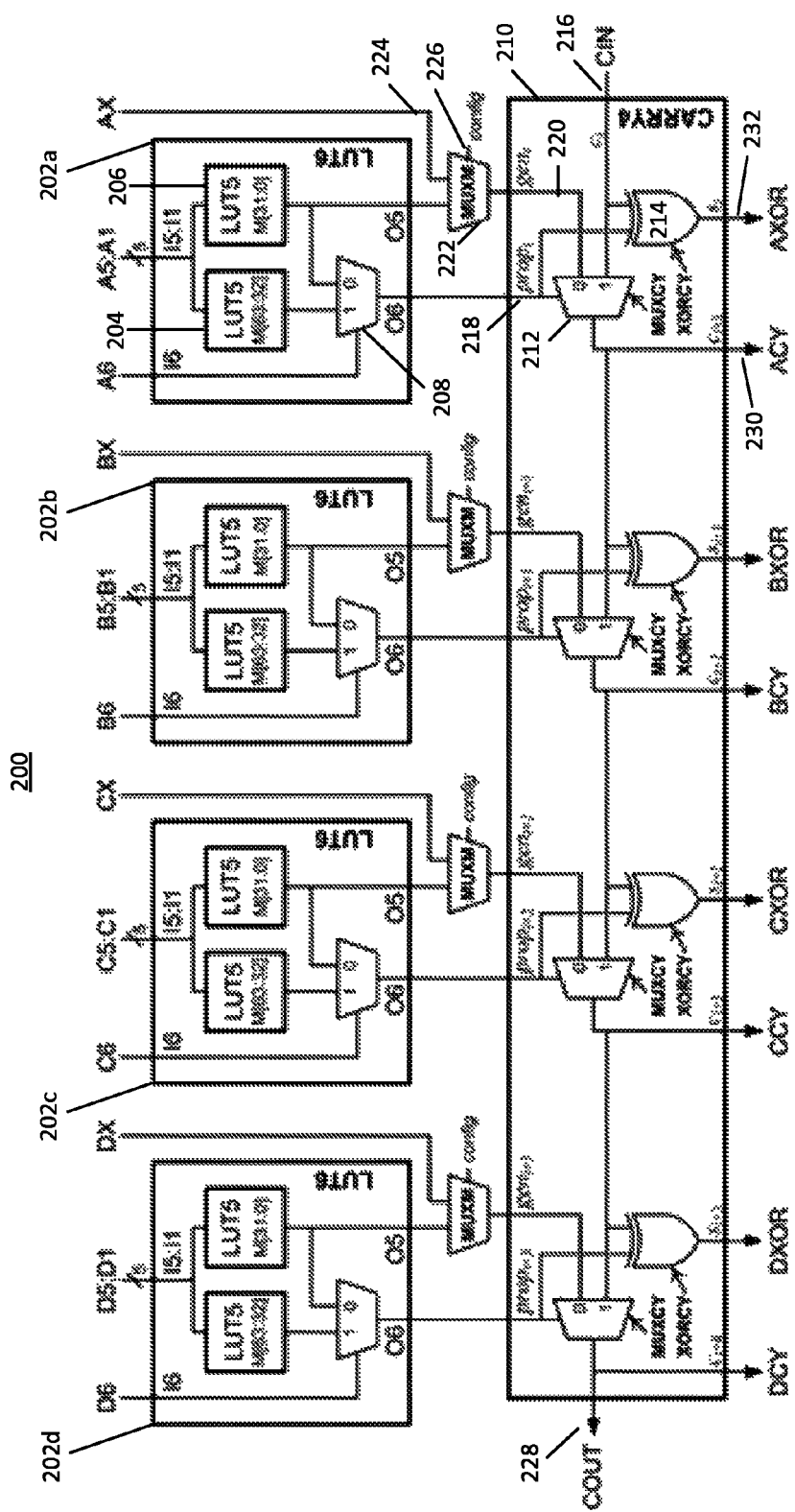
FIG. 2 is a schematic of a slice of configurable logic block, according to some embodiments.

FIG. 2 is a schematic of a slice 200 of configurable logic block, according to some embodiments. In particular, FIG. 2 is a schematic of a partial architecture of a slice 200 with fast carry logic, according to some embodiments. In some embodiments, slice 200 may have four 6-input lookup tables (LUT6s) 202. In some embodiments, each LUT6 202 may include two 5-input lookup tables (LUT5s) (204, 206) and a 2-to-1 multiplexer 208. In some embodiments, the two LUT5s may be 32×1 memories that share five inputs, designated I5:I1. The memory values are designated M[63:32] in one LUT5 204 and M[31:0] in the other LUT5 206.

The output of LUT5 206 is designated O5, which may be a function of up to five inputs (e.g., independent variables). The output of the M[63:32] LUT5 may be another function of the same five inputs (e.g., variables). The sixth input, I6, may be the select input to the multiplexer 208, which may select one of the LUT5 outputs. The output of multiplexer 208 is designated O6, which may be a function of up to six inputs (e.g., independent variables). To distinguish between inputs to different LUT6s 202 within the same slice 200, inputs are also designated A6:A1, B6:B1, C6:C1 and D6:D1.

In some embodiments, a slice 200 with fast carry logic may include a block 210 called CARRY4, which has a multiplexer 212 (MUXCY) and an XOR gate 214 (XORCY) for each LUT6 502. In some embodiments, CARRY4 blocks 210 in adjacent slices 200 within the same column may be connected to form fast carry chains for addition and/or other circuits. In some embodiments, the inputs to the CARRY4 may include a carry-in 216 (CIN), select signals 218 (prop) for each MUXCY 212, and one input 220 (gen) to each MUXCY 212. In some embodiments, the input 218 (prop) to a MUXCY 212 may be driven by the O6 output of the corresponding LUT6 202. In some embodiments, the input 220 (gen) to a MUXCY 212 may selected by multiplexer 222 (MUXM), and may be either the O5 output of the corresponding LUT6 202 or an input 224 from outside the slice, which is designated AX, BX, CX, or DX. In some embodiments, the selection of multiplexer 222 (MUXM) may be controlled by a configuration bit 226 (config). In some embodiments, the outputs of the CARRY4 include the carry-out 228 (COUT), the output 230 of each MUXCY, and the output 232 of each XORCY.

In some embodiments, block 210 may include eight D-type flip-flops not shown in FIG. 2, two flip-flops for each LUT6/MUXCY/XORCY group. In some embodiments, configurable routing options may allow O5, O6, AX/BX/CX/DX, the MUXCY output, and the XORCY output to either be registered or routed out of the slice without being registered.

B. Circuits for Addition

1. Two-Operand Adders. Suppose X and Y are to be added using the fast carry logic of FIG. 2. Table 1 gives the truth table for this operation. For the $i^{th}$ column of the adder, $x_i$ and $y_i$ are the bits of X and Y respectively, $c_i$ is the carry-in bit, $c_{i+1}$ is the carry-out bit and $s_i$ is the sum bit. According to some techniques, the MUXCY selects the source for the carry-out. When the select input, $prop_i$, is '1' the MUXCY propagates the carry-in to the carry-out. When $prop_i$ is '0', the $gen_i$ input is passed to the carry-out. The $gen_i$ signal may be used to generate a carry-out. Table 1 also shows the logic for the MUXCY propagate (prop) and generate (gen) signals.

TABLE 1

| Adder Inputs | | | Adder Outputs | | MUXCY Inputs | |
|---|---|---|---|---|---|---|
| $x_i$ | $y_i$ | $c_i$ | $c_{i+1}$ | $s_i$ | $prop_i$ | $gen_i$ |
| 0 | 0 | 0 | 0 | 0 | 0 | 0 |
| 0 | 0 | 1 | 0 | 1 | 0 | 0 |
| 0 | 1 | 0 | 0 | 1 | 1 | X |
| 0 | 1 | 1 | 1 | 0 | 1 | X |
| 1 | 0 | 0 | 0 | 1 | 1 | X |
| 1 | 0 | 1 | 1 | 0 | 1 | X |
| 1 | 1 | 0 | 1 | 0 | 0 | 1 |
| 1 | 1 | 1 | 1 | 1 | 0 | 1 |

FIG. 2 shows that $s_i = prop_i \oplus c_i$, so setting $prop_i$ to $x_i \oplus c_i$ produces the correct value for the sum bit, according to some techniques. FIG. 2 also shows that $c_{i+1}=prop_i'*gen_i+prop_i*c_i$ because it is the output of a MUXCY. When $prop_i=0$, the generate signal becomes the carry-out, so $gen_i$ is set to the value of $c_{i+1}$, according to some techniques. When $prop_i=1$, the generate signal is not used so it is a don't care. Table 1 summarizes the inputs to the MUXCY. Inspection of Table 1 shows that $prop_i=x_i \oplus y_i$ and that the generate signal can be $gen_i=x_i$ or $gen_i=y_i$, according to some techniques. The $prop_i$ signal is driven by O6, so O6 computes $prop_i=x_i \oplus y_i$, according to some techniques.

2. Ternary Adders. Suppose X, Y, and Z are to be added to produce a single sum vector, SUM. For the $i^{th}$ column of the adder, $x_i$, $y_i$ and $z_i$ are the bits of X, Y and Z respectively and are connected to three of the I5:I1 inputs of a LUT6, according to some techniques. In some techniques, logic for a full adder is used to add the three bits to produce a sum bit $abus_i$ and a carry bit $bbus_i$. In some techniques, carry bit $bbus_i$ is generated at the O5 output and connected to the next column. In some techniques, carry bit $bbus_{i-1}$ from the previous column is connected to one of the I5:I1 inputs and added to $abus_i$ using the technique described in Section I(B)(1). In some techniques, the logic is combined, resulting in the following configuration for the LUT6 and MUXCY in column i: (1) O5 implements $bbus_i=x_iy_i+y_iz_i+x_iz_i$ and is routed to the next LUT6; (2) O6 implements $x_i \oplus y_i \oplus bbus_{i-1}$ and is routed to $prop_i$; (3) $bbus_{i-1}$ from the previous LUT6 is routed to $gen_i$; (4) The output of the XORCY is the sum bit for column i.

Figure 3:
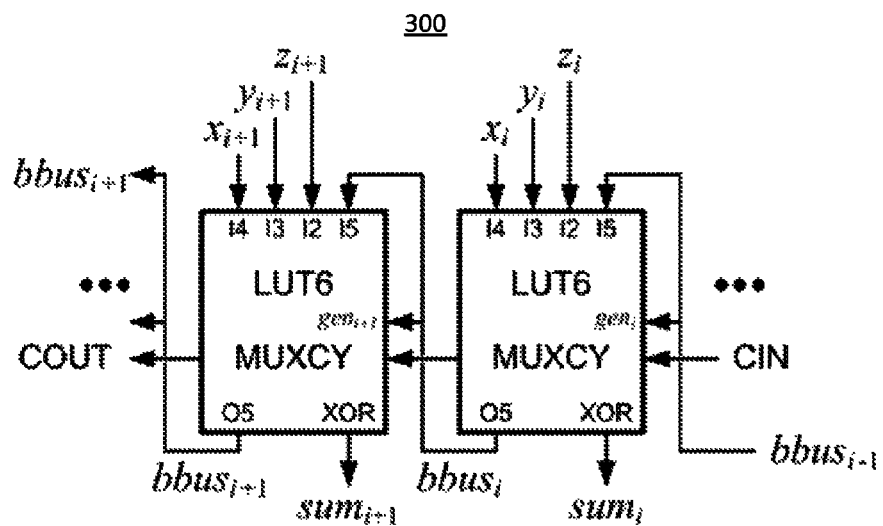
FIG. 3 is a schematic of an example of a ternary adder.

FIG. 3 shows the connections for a ternary adder 300, according to some techniques. In particular, FIG. 3 shows the connections for a Xilinx FPGA implementation of a ternary adder, according to some techniques. As can be seen, the same resources used to create a two-operand adder as described in Section I(B)(1) may be used to create a ternary adder 300.

C. Radix-4 Modified-Booth Multipliers

Suppose A and B are to be multiplied. If the multiplicand, A, is an m-bit two's complement integer and the multiplier, B, is an n-bit two's complement integer, then $$A = -a_{m-1} \cdot 2^{m-1} + \sum_{i=0}^{m-2} a_i \cdot 2^i \quad (1)$$

$$B = -b_{n-1} \cdot 2^{n-1} + \sum_{j=0}^{n-2} b_j \cdot 2^j. \quad (2)$$

MacSorley's modified-Booth recoding algorithm works for both unsigned and two's-complement multipliers. First, $b_{-1}$ is concatenated to the right of B and set to '0'. For two's-complement multipliers, n should be even. If n is not even, B is sign extended by one bit to make n even. For unsigned multipliers with odd values of n, B is zero-extended with one '0' to make n even. If n already is even, B is zero-extended with two '0's.

Next, B is recoded two bits at a time using overlapping groups of three bits. For each j $\Sigma\{0, 2, 4, \ldots, n-2\}$, $b_{j+1}$, $b_j$, and $b_{j-1}$ are recoded as radix-4 signed digits, $b'_\rho$, where $\rho=j/2$. Note that $b'_\rho=-2b_{j+1}+b_j+b_{j-1}$. Each partial product, $P_\rho$, is $b'_\rho*A$. Radix-4 modified-Booth digit recoding and partial-product selection is summarized in Table 2. Finally, the product is computed as $$P = \sum_{\rho=0}^{n/2-1} P_\rho \cdot 2^{2\rho}. \quad (3)$$

If a partial product is +A, then the multiplicand, A, is selected. If a partial product is +2A, then the multiplicand is shifted left one bit before selection. If a partial product is −A or −2A then A or 2A is subtracted by complementing each bit and adding '1' to the least-significant bit (LSB). Table 3 summarizes Radix-4 modified-Booth partial-product generation for each selection. Note that there are m+1 bits in the partial product to provide for a left shift of A, with sign extension if A is not shifted. The operation bit, $op_\rho$, is set to '1' for subtraction operations and is added to the LSB column of the partial product.

TABLE 2

| bj + 1 | bj | bj − 1 | b'$_\rho$ | P$_\rho$ |
|---|---|---|---|---|
| 0 | 0 | 0 | 0 | 0 |
| 0 | 0 | 1 | 1 | +A |
| 0 | 1 | 0 | 1 | +A |
| 0 | 1 | 1 | 2 | +2A |
| 1 | 0 | 0 | −2 | −2A |
| 1 | 0 | 1 | −1 | −A |
| 1 | 1 | 0 | −1 | −A |
| 1 | 1 | 1 | 0 | 0 |

TABLE 3

| P$_\rho$ | P$_{\rho, m}$ | P$_{\rho, m-1}$ | P$_{\rho, m-2}$ | $\cdots$ | P$_{\rho, 2}$ | P$_{\rho, 1}$ | P$_{\rho, 0}$ | op$_\rho$ |
|---|---|---|---|---|---|---|---|---|
| +0 | 0 | 0 | 0 | $\ldots$ | 0 | 0 | 0 | 0 |
| +A | $a_{m-1}$ | $a_{m-1}$ | $a_{m-2}$ | $\ldots$ | $a_2$ | $a_1$ | $a_0$ | 0 |
| +2A | $a_{m-1}$ | $a_{m-2}$ | $a_{m-3}$ | $\ldots$ | $a_1$ | $a_0$ | 0 | 0 |
| −A | $\overline{a_{m-1}}$ | $\overline{a_{m-1}}$ | $\overline{a_{m-2}}$ | $\ldots$ | $\overline{a_2}$ | $\overline{a_1}$ | $\overline{a_0}$ | 1 |
| −2A | $\overline{a_{m-1}}$ | $\overline{a_{m-2}}$ | $\overline{a_{m-3}}$ | $\ldots$ | $\overline{a_1}$ | $\overline{a_0}$ | 1 | 1 |

In order to provide for correct addition and subtraction of the partial products, each partial product is sign extended to the width of the multiplier. FIG. 4A shows the partial-product matrix for an 8×8 radix-4 modified-Booth multiplier with basic sign extension. Sign extension by repeating the most-significant bit (MSB) may increase the loading on the logic gate that generates it and require extra wiring, which may increase area, delay, and power. An alternative technique is shown in FIG. 4B, where the sign bit is complemented, '1' is added in the same column, and '1's are used for sign extension, instead of the actual sign bit. The technique illustrated in FIG. 4B may be more efficient than the technique illustrated in FIG. 4A. FIG. 4C shows the simplified partial-product matrix after all the '1's are added together.

II. Circuits for Addition

A. Two-Operand Adder

Figure 5:
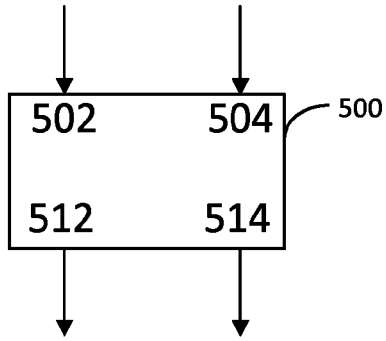
FIG. 5 is a block diagram of a producer structure, according to some embodiments.

FIG. 5 illustrates a block diagram of a producer structure 500, according to some embodiments. Producer structure 500 includes input terminals 502 (In1) and 504 (In2), and output terminals 512 (Out1) and 514 (Out2). Input terminal 502 (In1) may be configured to receive an input V of one or more bits, including, but not limited to, an input of between one and five bits, and input terminal 504 (In2) may be configured to receive a 1-bit input X. In some embodiments, the one or more bits received at input terminal 502 (In1) may include one or more bits of a number A and/or one or more bits of a number B.

In some embodiments, producer structure 500 may include a programmable logic circuit (PLC) programmed or configured to decode the input V or to produce a result of a function of the one or more bits of input V. In some embodiments, the PLC may include any suitable programmable circuit, including, but not limited to a lookup table, a generic array logic devices (GAL), and/or a complex programmable logic devices (CPLD). In some embodiments, the result provided by the PLC may include a bit of a partial product Y of an algorithm for determining the product of numbers A and B. The partial product may include, but is not limited to, a partial product of a radix-4 Booth multiplier. In some embodiments, the result provided by the PLC may include an inverse of the bit of the partial product Y.

In some embodiments, output terminal 512 (Out1) may be configured to provide a bit having a value equal to the exclusive-OR ("XOR") of the bit of partial product Y and the bit X. In some embodiments, output terminal 514 (Out2) may be configured to provide the bit of partial product Y or the bit X.

Some embodiments of producer structure 500 are described herein. In some embodiments, producer structure 500 may include a LUT6 202, as illustrated in FIG. 2. Input terminals 502 and 504 of producer structure 500 may correspond to inputs I5:I1 and I6 of LUT6 202, respectively. Output terminals 512 and 514 of producer structure 500 may correspond to outputs O6 and O5 of LUT6 202, respectively. In some embodiments, producer structure 500 may further include a multiplexer 222 (MUXM), coupled to LUT6 202 as shown in FIG. 2. In some embodiments, an inverter may be substituted for one of the LUT5s (204, 206) in LUT6 202 of producer structure 500. The inverter may be configured to provide the inverse of the output of the remaining LUT5 (e.g., the inverter may have its input coupled to the output of the remaining LUT5), In some embodiments, the memory values of the LUT6 (e.g., the memory values of the LUT5s) may be determined in accordance with the techniques described below.

Figure 6:
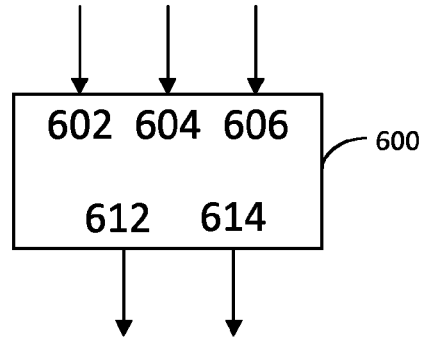
FIG. 6 is a block diagram of an adder structure, according to some embodiments.

FIG. 6 illustrates a block diagram of an adder structure 600, according to some embodiments. Adder structure 600 includes input terminals 602 (In1), 604 (In2), and 606 (Cin), and output terminals 612 (Cout) and 614 (S). In some embodiments, input terminal 604 (In2) may be configured to receive a 1-bit input J. In some embodiments, input terminal 602 (In1) may be configured to receive a 1-bit input K that is equal to the XOR of J and a third 1-bit value, L. In some embodiments, adder structure 600 may be configured to generate the 2-bit sum of bits J, L, and Cin. In some embodiments, adder structure 600 may provide the most significant bit of the 2-bit sum at terminal 612 (Cout), and the least significant bit of the 2-bit sum at terminal 614 (S).

Some embodiments of adder structure 600 are described herein. In some embodiments, adder structure 600 may include a multiplexer 212 (MUXCY) and an XOR gate 214 (XORCY) coupled as shown in FIG. 2. Input terminals 602, 604, and 606 of adder structure 600 may correspond to inputs $prop_i$, $gen_i$, and $c_i$ of CARRY4 block 210, respectively. Output terminals 612 and 614 of adder structure 600 may correspond to outputs $c_{i+1}$ and $s_i$ of CARRY4 block 210, respectively.

In some embodiments, a two-operand adder circuit may be configured to receive one or more bits encoding a bit of a first addend, a bit of a second addend, and a carry-in bit, and to provide an output representing a sum of the bit of the first addend, the bit of the second addend, and the carry-in bit. In some embodiments, the two-operand adder circuit may be configured such that the first addend is a partial product of a multiplication operation.

Figure 7:
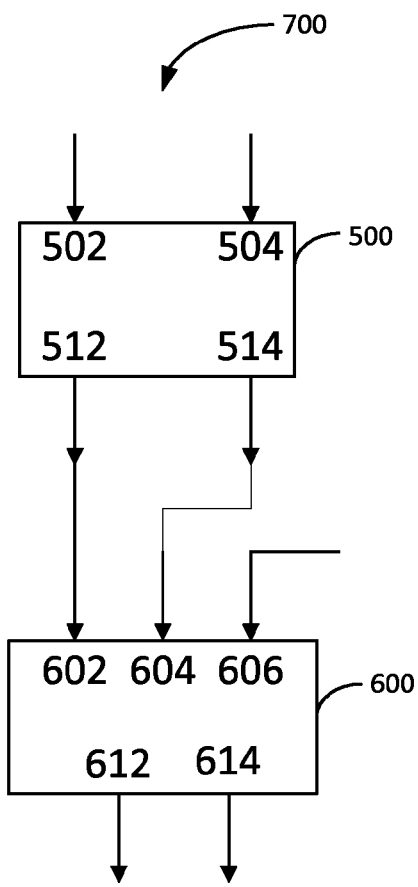
FIG. 7 is a block diagram of a two-operand adder structure, according to some embodiments.

FIG. 7 illustrates a block diagram of a two-operand adder structure 700, according to some embodiments. In some embodiments, two-operand adder structure 700 may include a producer structure 500 and an adder structure 600, with terminal 512 of producer structure 500 coupled to terminal 602 of adder structure 600, and with terminal 514 of producer structure 500 coupled to terminal 604 of adder structure 600. In some embodiments, two-operand adder structure 700 may be configured to generate the 2-bit sum of a bit X (received at input 504 of producer structure 500), a bit Y (produced by producer structure 500 from one or more bits received at input 502 of producer structure 500), and a bit received at input terminal 606 of adder structure 600. In some embodiments, two-operand adder structure 700 may provide the most significant bit of the 2-bit sum at terminal 612, and the least significant bit of the 2-bit sum at terminal 614.

Some embodiments of two-operand adder structure 700 are described herein. In some embodiments, two-operand adder structure 700 may include a LUT6 circuit 202, a multiplexer 212 (MUXCY), and an XOR gate 214 (XORCY) coupled as shown in FIG. 2, but with $gen_i$ coupled to O5, and without multiplexer 222 (MUXM) and inputs 224 (AX) and 226 (config). In some embodiments, two-operand adder structure 700 may further include multiplexer 222 (MUXM) and inputs 224 (AX) and 226 (config) coupled as shown in FIG. 2.

The following paragraphs describe how, in some embodiments, the two-operand adder structure 700 may be configured to receive one or more bits encoding a bit $y_i$ of a first addend Y, a bit $x_i$ of a second addend X, and a carry-in bit $c_{in}$, and to provide an output representing a sum of the bit of the first addend, the bit of the second addend, and the carry-in bit. These paragraphs refer, in part, to components illustrated in FIG. 2. As discussed above, these components may be arranged, in some embodiments, to form a two-operand adder structure 700.

In slice 200 of FIG. 2, the $prop_i$ signal may be set to $x_i \oplus y_i$ and the $gen_i$ signal may be set to either $x_i$ or $y_i$ to add $x_i$ and $y_i$, according to some techniques. $Prop_i$ may be driven by O6 and $gen_i$ may be driven by either O5 or AX/BX/CX/DX, as shown in FIG. 2, according to some techniques. The LUT6 may be configured as two LUT5s with five shared inputs and two outputs, or as one LUT6 with six inputs and one output, according to some techniques. If $x_i$ and $y_i$ together are a function of five or fewer inputs, the LUT6 may, be configured as two LUT5s, generating $x_i$ or $y_i$ at O5 and routing it to $gen_i$, and generating $x_i \oplus y_i$ at O6 to drive $prop_i$. If $x_i$ and $y_i$ together are a function of six inputs, the LUT6 may be configured to generate $x_i \oplus y_i$ at O6 to drive $prop_i$, and $x_i$ or $y_i$ may be generated in a separate LUT and applied to the AX/BX/CX/DX input and configured to drive the $gen_i$ input.

Referring again to FIG. 2, Xilinx documentation and patents indicate that when a LUT6 502 is used to generate a function of six inputs, O5 is unused and the function is output at O6. However, the inventor has recognized and appreciated at least three useful cases where two functions of six variables may be generated using one LUT6 202. In some embodiments, x (a function of one variable) may be connected to I6 and y (a function of five variables) may be connected to I5:I1. In some embodiments, the function y may be stored in LUT5 206, so y may be generated at O5. When I6 is '0', y may also be generated at O6. When I6 is '1', the function stored in LUT5 204 may be generated at O6. The function stored in LUT5 204 may determine the output O6 as follows. In a first configuration where all '0's are stored in LUT5 204, the function x'y may be generated at O6. In a second configuration where all '1's are stored in LUT5 204, the function x OR y may be generated at O6. In a third configuration where y' is stored in LUT5 204, the function x⊕y may be generated at O6.

In some embodiments, the third configuration may be used to add $x_i$ and $y_i$ without using the AX/BX/CX/DX input when $x_i$ is a function of one variable and $y_i$ is a function of up to five variables. In some embodiments, this third configuration frees the AX/BX/CX/DX input to be used for pass-through routing or to be connected to a flip-flop in the slice 200. In some embodiments, this third configuration may allow an independent register to be implemented in a slice of the Spartan-6 or Virtex-5 if the flip-flop is not used to register the sum bit. In some embodiments, this third configuration may allow an independent register to be implemented and a sum bit to be registered in a slice of the Virtex-6 and in 7-series FPGAs. In some embodiments, the third configuration may allow faster inputs to be used.

Thus, in some embodiments, two-operand adder structure 700 may be configured to provide an output representing a sum of bits $x_i$, $y_i$, and $c_{in}$, by (1) coupling input 502 to receive one or more bits (e.g., up to five bits) encoding bit $y_i$, (2) coupling input 504 to receive bit $x_i$, (3) coupling input 606 to receive bit $c_{in}$, (4) coupling producer structure 500 and adder structure 600 as shown in FIG. 7, (5) configuring LUT5 206 of producer structure 500 to generate bit $y_i$, and (6) configuring LUT5 204 of producer structure 500 to generate bit $y_i'$.

Figure 8:
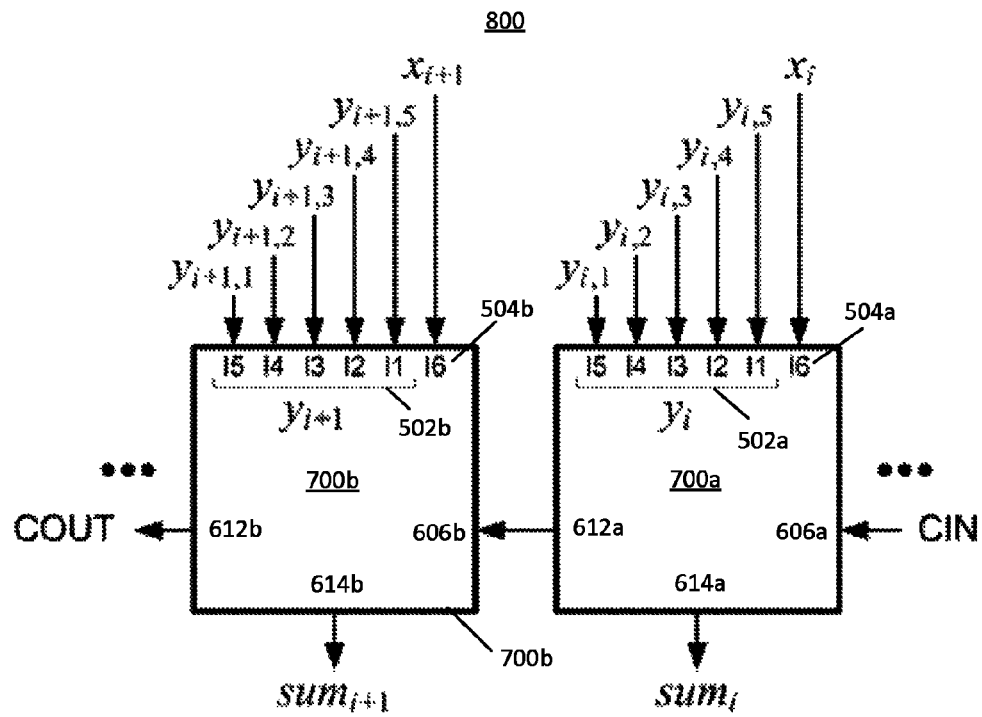
FIG. 8 is a schematic of a two-operand adder, according to some embodiments.

In some embodiments, two or more two-operand adder circuits 700 may be coupled together to form a multi-bit two-operand adder. FIG. 8 is a schematic of a multi-bit two-operand adder 800, according to some embodiments. The multi-bit two-operand adder 800 of FIG. 8 may be formed by coupling multiple two-operand adder circuits 700 in the manner illustrated in FIG. 8. In some embodiments, n-bit two-operand adder 800 may include n LUT6s with fast carry logic arranged as shown in FIG. 2, with LUT5 206 configured to generate bit $y_i$ and with LUT5 204 configured to generate bit $y_i'$. In some embodiments, $gen_i$ may be coupled to O5, and n-bit two operand adder 800 may exclude multiplexer 222 (MUXM) and inputs 224 (AX) and 226 (config).

Embodiments have been described in which producer structure 500 and adder structure 600 are configured to implement a two-operand adder structure 700. In some embodiments, producer structure 500 and adder structure 600 may be configured as shown, for example, in FIGS. 9 and/or 10, to form a ternary adder (e.g., a multi-bit ternary adder). In some embodiments, producer structure 500 and adder structure 600 may be configured as shown, for example, in FIG. 11, to form a compressor (e.g., a 4 to 2 compressor).

B. Ternary Adder

In some embodiments, two or more two-operand adder structures 700 may be coupled together (as shown, for example, in FIGS. 9 and 10) to perform multi-bit addition.

The ternary adder illustrated in FIG. 3 and described in Section I(B)(2) may be too slow for some applications because the routing for the BBUS signals may not be as fast as the fast carry logic and therefore may add delay to the critical path. A faster alternative may be to use two cascaded two-operand adders, one to add X+Y and the other to add the intermediate result to Z, but this technique would require twice the resources as the ternary adder of FIG. 3. In some embodiments, a ternary adder faster than ternary adder 300 of FIG. 3 may be provided, without using twice the resources of ternary adder 300.

Figure 9:
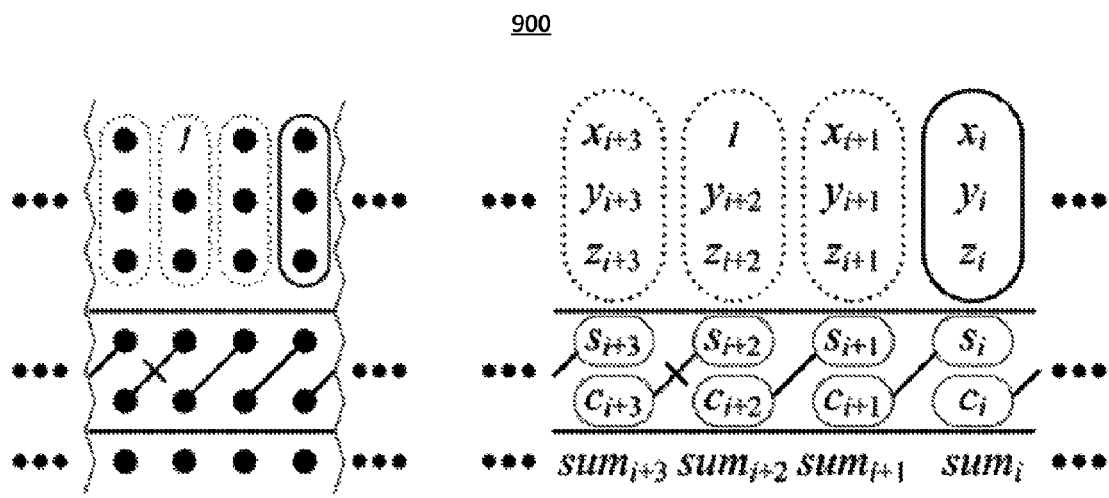
FIG. 9 is a dot diagram of a ternary adder, according to some embodiments.

FIG. 9 shows a partial dot diagram 900 of a ternary adder 1000, according to some embodiments. In the first stage of dot diagram 900, the three operands X, Y and Z may be reduced to an intermediate sum vector S and carry vector C using full adders. In the next stage of dot diagram 900, a two-operand adder may produce the final sum (SUM).

Figure 10:
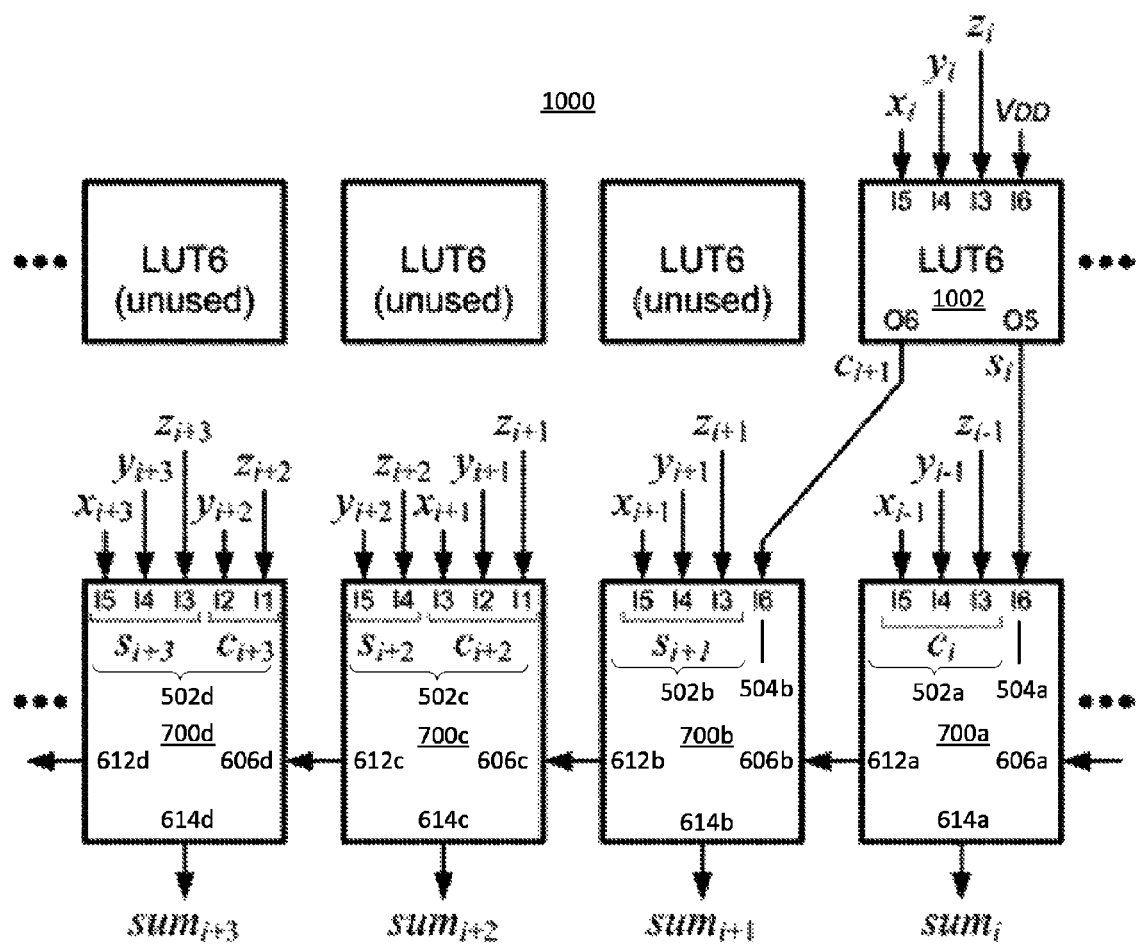
FIG. 10 is a schematic of a ternary adder, according to some embodiments.

FIG. 10 shows a schematic of a ternary adder 1000, according to some embodiments. In some embodiments, two-operand adder structures 700 may be used to produce the final sum (SUM) by adding the intermediate sum vector (S) and carry vector (C). In some embodiments, LUT6s 1002 may be used to implement every other full adder, indicated in dot diagram 900 by a solid oval around the operand bits. In some embodiments, the intermediate sum bits (s) and intermediate carry bits (c) of these full adders may be routed to the inputs 504 (I6) of the appropriate two-operand adder structures 700. In some embodiments, logic for the full adders that are indicated in dot diagram 900 by dotted ovals may be distributed and absorbed into the LUT6s of the two-operand adder structures 700. In some embodiments, the operand bits (x, y, z) may be routed to input 502 of the corresponding two-operand adder structure 700 and coupled to the 15:13 inputs of the two-operand adder structure's LUT6. In some embodiments, two-operand adder structure 700 may use the operand bits to generate an intermediate sum or carry bit and add it to the intermediate carry or sum bit coupled to the 16 input. This technique is shown, for example, in the two less significant columns in FIGS. 9 and 10.

In the case where $s_i$ and $c_i$ together are a function of five variables or less, such as when one is the output of a half adder or one of the operand bits is a constant '1', both $s_i$ and $c_i$ may, in some embodiments, be generated in the corresponding two-operand adder structure 700, reducing the required LUT6 1002 to a LUT5 or possibly eliminating it altogether. This technique is shown for the two more significant columns in FIGS. 9 and 10, where $x_{i+2}=1$. In this case a special half adder may be used to generate $s_{i+2}$ and $c_{i+3}$, and the logic for the special half adder may be absorbed into the LUT6s of the two-operand adder structures 700, according to some embodiments. The term special half adder is used herein to describe a half adder that adds two variable bits plus a constant '1'. In some embodiments, an n-bit ternary adder may include n LUT6s with fast carry logic (in n two-operand adder structures 700) and at most [n/2] additional LUT6s 1002, compared to only n LUT6s with fast carry logic for ternary adder 300 described in Section I(B)(2). However, ternary adder 1000 may not have the slow BBUS routing in the critical path and therefore may be faster. In some embodiments, some LUT6s in a slice 200 (or CLB 100) may be used to implement full adders and some LUT6s in the slice (or CLB) may be used to implement two-operand adder structures 700, so the carry out signal remains within the slice (or CLB), thereby decreasing routing delay.

C. 4:2 Compressor

Ternary adders may be useful for implementing multi-operand adders, including, without limitation, multi-operand adders that add partial products in a multiplier. When ternary adders are used, each ternary adder may reduce the height of the addition matrix by two rows. An alternative to the ternary adder is the 4:2 compressor. In some embodiments, a 4:2 compressor may add four rows of an addition matrix to produce a sum and a carry vector, thereby reducing the height of the addition matrix by two rows.

Figure 11A:
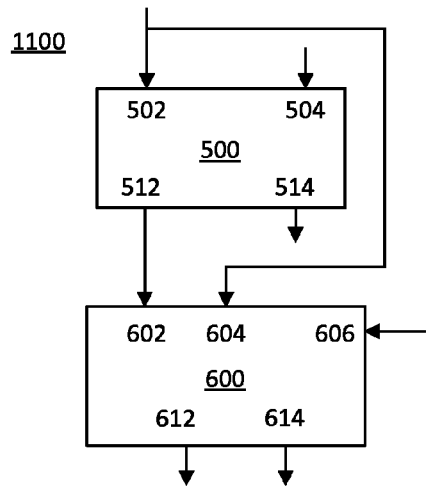
FIG. 11A is a block diagram of a one-bit 4:2 compressor structure, according to some embodiments.

FIG. 11A is a block diagram of a one-bit 4:2 compressor structure 1100, according to some embodiments. In some embodiments, compressor structure 1100 may add four one-bit operands (w, x, y, and z) and a carry-in bit ($c_{in}$) to generate a sum bit (sum), an intermediate carry bit (carry), and a carry-out bit ($c_{out}$). In some embodiments, compressor structure 1100 may include a producer structure 500 and an adder structure 600. In some embodiments, input 502 of compressor structure 1100 may be coupled to receive the four one-bit operands (e.g., inputs I5:I2 of the LUT6 of producer structure 500 may be coupled to receive operands w, x, y, and z, respectively). In some embodiments, input 602 of adder structure 600 may be coupled to receive output 512 of producer structure 500. In some embodiments, input 604 ($gen_i$) of adder structure 600 may be coupled to receive an operand (e.g., w). In some embodiments, input 606 of adder structure 600 may be coupled to receive a carry-in bit ($c_{in}$). In some embodiments, outputs 612, 614, and 514 (O5) may be coupled to provide a carry-out bit ($c_{out}$), a sum bit (sum), and an intermediate carry bit (carry), respectively.

As can be seen by comparing FIG. 11A and FIG. 7, compressor structure 1100 and two-operand adder structure 700 may be similar in many respects. In some embodiments, compressor structure 1100 may be configured in the same manner as two-operand adder structure 700, except that input 604 of adder structure 600 may be coupled to receive an operand (e.g., w) rather than being coupled to output 514 of producer structure 500.

Figure 11B:
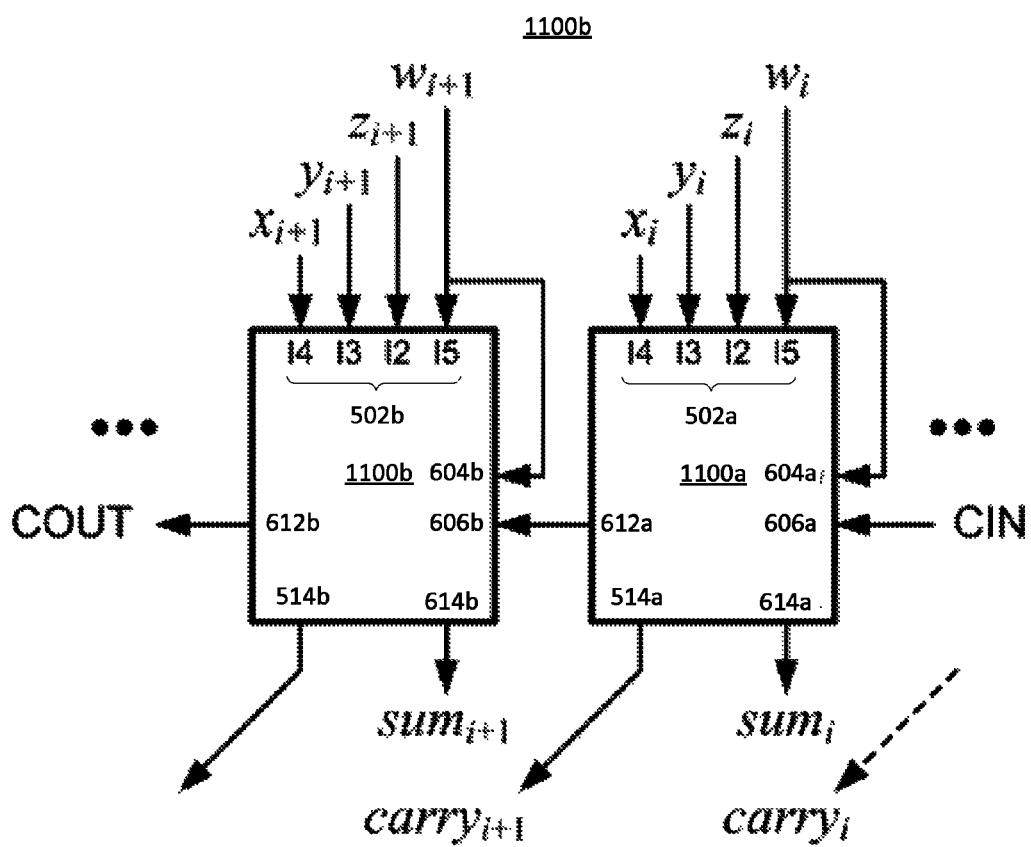
FIG. 11B is a schematic of an n-bit 4:2 compressor, according to some embodiments.

FIG. 11B shows a schematic of an n-bit 4:2 compressor 1150, according to some embodiments. In some embodiments, n-bit 4:2 compressor 1150 may include n LUT6s with fast carry logic, which is the same number of LUT6s used by n-bit ternary adder 300 described in Section I(B)(2). (A ternary adder may be thought of as a 4:2 compressor that adds three numbers plus its own carry vector output to produce a single vector sum.) The n-bit 4:2 compressor 1150 may be faster than ternary adder 300, because n-bit 4:2 compressor 1150 does not have the slow BBUS routing in the critical path.

III. Circuits and Techniques for Multiplication

In some embodiments, two or more two-operand adder structures may be coupled together to perform multi-bit partial product generation and addition as part of a multiplier (e.g., a Booth multiplier), including, but not limited to, a modified-Booth multiplier and/or a radix-4 Booth multiplier. In some embodiments, one or more two-operand adder structures may generate a radix-4 partial product and add the radix-4 partial product to another number (e.g., another radix-4 partial product). In some embodiments, one or more two-operand adder structures may generate a row of radix-4 partial products and add the row of radix-4 partial products to another row of radix-4 partial products. In some embodiments, the sums produced by the two-operand adder structures may be added to produce the product of two numbers using a parallel tree adder, a serial adder, an array adder, a hybrid adder, or any other suitable adder.

In some embodiments, a multiplier based on the radix-4 modified-Booth recoding algorithm may be provided. In some embodiments, a multiplier's partial products may be generated efficiently, with much of the logic for partial product generation absorbed into the multiplier's first stage adders. In some embodiments, the multiplier's remaining addition stages may use the addition circuits described in Section II (e.g., two-operand adder structures and/or multi-bit two-operand adders).

A. Partial Product Selection and Generation

Booth recoding as described in Section I(C) generates $P_\rho = (00 \ldots 00)$ and $op_\rho = 0$ when $b_{j+1}, b_j, b_{j-1} = (1, 1, 1)$, which adds zero. In some embodiments of a multiplier, $P_\rho = (11 \ldots 11)$ and $op_\rho = 1$ is generated when $b_{j+1}, b_j, b_{j-1} = (1, 1, 1)$, which subtracts zero. With this modification, the operation bit $op_\rho = b_{2\rho+1}$, as opposed to recoding and selection techniques where $op_\rho$ is a function of three variables. In some embodiments, this modification simplifies the logic used to generate $Op_\rho$, and simplifies layout on the FPGA fabric. Table 4 shows a multiplier's partial-product selection and generation, according to some embodiments.

TABLE 4

| $P_\rho$ | $P_{\rho,m}$ | $P_{\rho,m-1}$ | $P_{\rho,m-2}$ | ... | $P_{\rho,2}$ | $P_{\rho,1}$ | $P_{\rho,0}$ | $op_\rho$ |
|---|---|---|---|---|---|---|---|---|
| +0 | 0 | 0 | 0 | ... | 0 | 0 | 0 | 0 |
| +A | $a_{m-1}$ | $a_{m-1}$ | $a_{m-2}$ | ... | $a_2$ | $a_1$ | $a_0$ | 0 |
| +2A | $a_{m-1}$ | $a_{m-2}$ | $a_{m-3}$ | ... | $a_1$ | $a_0$ | 0 | 0 |
| −0 | 1 | 1 | 1 | ... | 1 | 1 | 1 | 1 |
| −A | $\overline{a_{m-1}}$ | $\overline{a_{m-1}}$ | $\overline{a_{m-2}}$ | ... | $\overline{a_2}$ | $\overline{a_1}$ | $\overline{a_0}$ | 1 |
| −2A | $\overline{a_{m-1}}$ | $\overline{a_{m-2}}$ | $\overline{a_{m-3}}$ | ... | $\overline{a_1}$ | $\overline{a_0}$ | 1 | 1 |

B. Partial-Product Generation

1. Partial-Product Generation, $\rho = 0$: In some embodiments, for the two LSBs of $P_0$, $$p_{0,1} = f(b_1, b_0, a_1, a_0) \tag{4}$$

$$p_{0,0} = f(b_1, b_0, a_0). \tag{5}$$

In some embodiments, together, $p_{0,1}$ and $p_{0,0}$ are a function of four variables, $$(p_{0,1}, p_{0,0}) = f(b_1, b_0, a_1, a_0). \tag{6}$$

In some embodiments, the two bits may be computed using two LUT5s in the same LUT6, generating $p_{0,1}$ at O6 and $p_{0,0}$ at O5.

In some embodiments, for any adjacent pair of bits in the middle of $P_0$, $$p_{0,i+1} = f(b_1, b_0, a_{i+1}, a_i) \tag{7}$$

$$p_{0,i} = f(b_1, b_0, a_i, a_{i-1}). \tag{8}$$

In some embodiments, together, $p_{0,i+1}$ and $p_{0,i}$ may be a function of five variables, $$(p_{0,i+1}, p_{0,i}) = f(b_1, b_0, a_{i+1}, a_i, a_{i-1}). \tag{9}$$

In some embodiments, the two bits may be computed using two LUT5s in the same LUT6, generating $p_{0,i+1}$ at O6 and $p_{0,i}$ at O5.

For the two MSBs of $P_0$, $$p_{0,m} = f(b_1, b_0, a_{m-1}) \tag{10}$$

$$p_{0,m-1} = f(b_1, b_0, a_{m-1}, a_{m-2}). \tag{11}$$

In some embodiments, together, $p_{0,m}$ and $p_{0,m-1}$ may be a function of four variables, $$(p_{0,m}, p_{0,m-1}) = f(b_1, b_0, a_{m-1}, a_{m-2}). \tag{12}$$

In some embodiments, the two bits may be computed using two LUT5s in the same LUT6, generating $p_{0,m}$ at O6 and $p_{0,m-1}$ at O5.

In some embodiments, for an m-bit multiplicand, $P_0$ may be generated using [m/2] LUT6s and one LUT5 if m is even.

2. Partial-Product Generation, $\rho \geq 1$: In some embodiments, for the two LSBs of $P_\rho$ where $\rho \geq 1$, $$p_{\rho,1} = f(b_{2\rho+1}, b_{2\rho}, b_{2\rho-1}, a_1, a_0) \tag{13}$$

$$p_{\rho,0} = f(b_{2\rho+1}, b_{2\rho}, b_{2\rho-1}, a_0). \tag{14}$$

In some embodiments, together, $p_{\rho,1}$ and $p_{\rho,0}$ may be a function of five variables, $$(p_{\rho,1},p_{\rho,0})=f(b_{2\rho+1},b_{2\rho},b_{2\rho-1},a_1,a_0). \quad (15)$$

In some embodiments, the two bits may be computed using two LUT5s in the same LUT6, generating $p_{\rho,1}$ at O6 and $p_{\rho,0}$ at O5.

In some embodiments, for middle bits of $P_\rho$, $$p_{\rho,i+1}=f(b_{2\rho+1},b_{2\rho},b_{2\rho-1},a_{i+1},a_i) \quad (16)$$

$$p_{\rho,i}=f(b_{2\rho+1},b_{2\rho},b_{2\rho-1},a_1,a_{i-1}). \quad (17)$$

In some embodiments, together, $p_{\rho,i}$ and $p_{\rho,i+1}$ may be a function of six variables, $$(p_{\rho,i+1},p_{\rho,i})=f(b_{2\rho+1},b_{2\rho},b_{2\rho-1},a_{i+1},a_i,a_{i-1}). \quad (18)$$

A single, conventionally-configured LUT6 may not generate two independent functions of six variables. Individually, each bit may be a function of five variables, so the bits may, in some embodiments, be generated using two LUT5s from different LUT6s. In some embodiments, one LUT5 in one LUT6 generates $p_{\rho,i+1}$ at O5 and one LUT5 in a separate LUT6 generates $p_{\rho,i}$ at O5.

In some embodiments, for the two MSBs of $P_\rho$, $$p_{\rho,m}=f(b_{2\rho+1},b_{2\rho},b_{2\rho-1},a_{m-1}) \quad (19)$$

$$p_{\rho,m-1}=f(b_{2\rho+1},b_{2\rho},b_{2\rho-1},a_{m-1},a_{m-2}) \quad (20)$$

Together, $p_{\rho,m}$ and $p_{\rho,m-1}$ may be a function of five variables, $$(p_{\rho,m},p_{\rho,m-1})=f(b_{2\rho+1},b_{2\rho},b_{2\rho-1},a_{m-1},a_{m-2}) \quad (21)$$

In some embodiments, the two bits may be computed using two LUT5s in the same LUT6, generating $p_{\rho,m}$ at O6 and $p_{\rho,m-1}$ at O5.

In some embodiments, for an m-bit multiplicand, $P_\rho$ for $\rho \geq 1$ may be generated using m−1 LUT6s.

C. Partial-Product Addition

Figure 12:
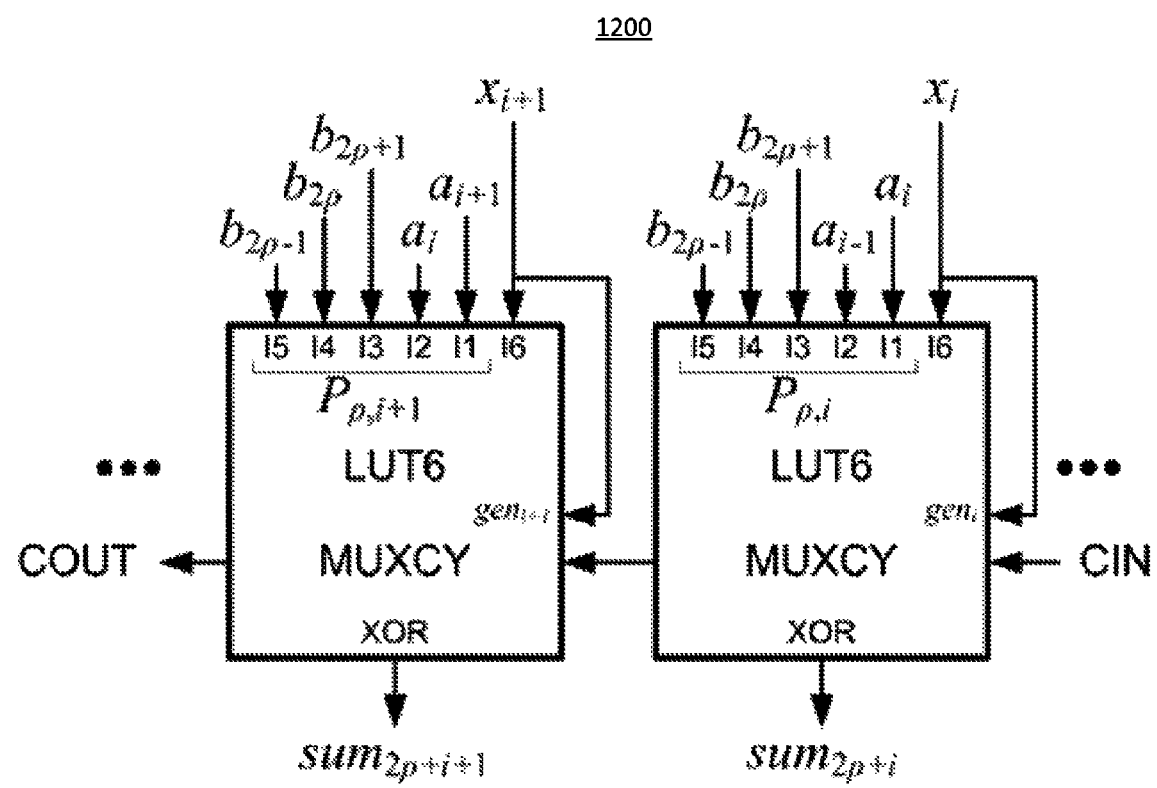
FIG. 12 is a schematic of a generate-add structure, according to some embodiments.

1. Generate-Add Structure: FIG. 12 is a schematic of a generate-add structure 1200, according to some embodiments. In some embodiments, generate-add structure 1200 may be configured to generate one or more partial product bits and add them to an arbitrary number X (e.g., a partial product). In some embodiments, x may be a bit of a partial product, and a and b may be bits of operands being multiplied.

As discussed in Section III(B), any partial product bit $p_{\rho,i}$ may be a function of five or fewer inputs and may be implemented in a LUT5, according to some embodiments. In some embodiments of generate-add structure 1200, the five or fewer inputs used to generate partial product bit $p_{\rho,i}$ may be wired to inputs I5:I1. In some embodiments, the fastest inputs may be used in cases where there are fewer than five inputs. In some embodiments, the bit of X to be added, $x_i$, may be wired to both I6 and to the bypass input, AX/BX/CX/DX. In some embodiments, The function $p_{\rho,i} \oplus x_\rho$, which is a function of up to six inputs, may be generated at O6 and wired to $prop_i$ of the MUXCY. In some embodiments, the bypass input AX/BX/CX/DX may be wired to $gen_i$ so that $gen_i = x_i$. With this configuration, the partial product bits may be generated and added to X, producing the sum at the output of the XORCY.

Figure 13:
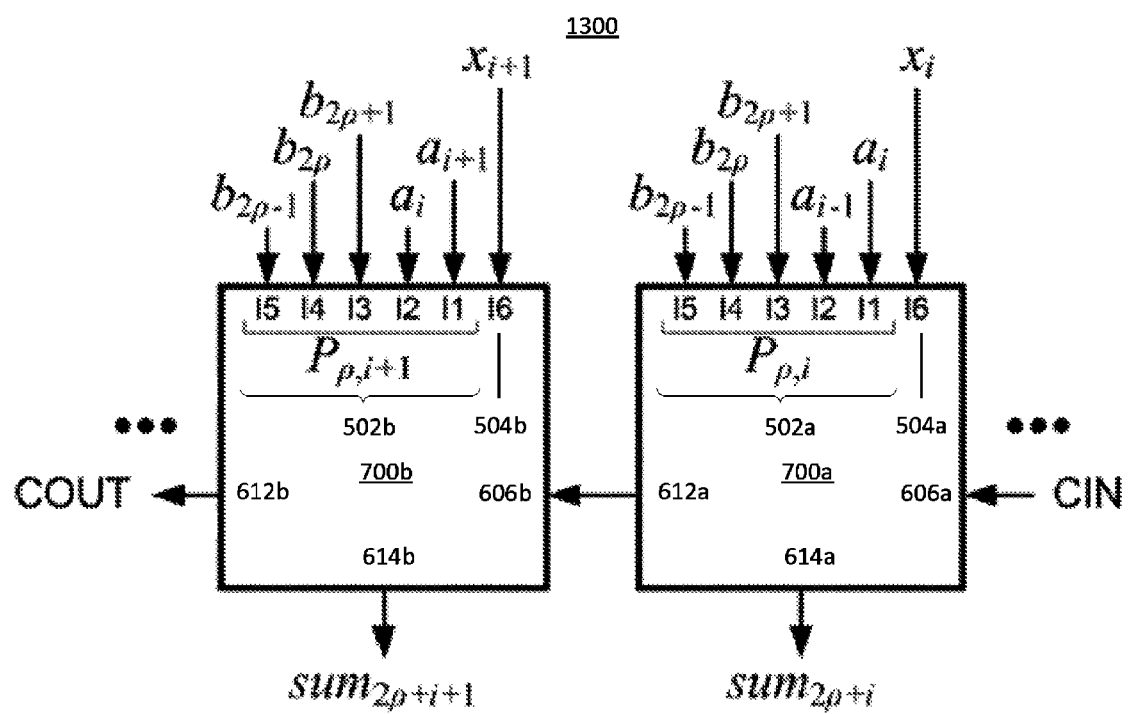
FIG. 13 is a schematic of a generate-add structure, according to some embodiments.

FIG. 13 shows a schematic of a generate-add structure 1300, according to some embodiments. In some embodiments, generate-add structure 1300 may be configured to generate one or more partial product bits and add them to an arbitrary number X (e.g., a partial product). In some embodiments, x may be a bit of a partial product, and a and b may be bits of operands being multiplied.

In some embodiments, generate-add structure 1300 includes one or more two-operand adder structures 700. In some embodiments, the five or fewer inputs used to generate partial product bit $p_{\rho,i}$ may be coupled to input 502 of two-operand adder structure 700 (inputs I5:I1). In some embodiments, the fastest inputs may be used in cases where there are fewer than five inputs. In some embodiments, the bit of X to be added, $x_i$, may be coupled to input 504 of two-operand adder structure 504 (input I6). In some embodiments, the M[31:0] LUT5 of two-operand adder structure 700 is configured to generate $p_{\rho,i}$, and the M[63:32] LUT5 of two-operand adder structure 700 is configured to generate $p'_{\rho,i}$. In some embodiments, O6 may generate $p_{\rho,i} \oplus x_i$ and may be coupled to input 602 ($prop_i$) of two-operand adder structure 700. In some embodiments, O5 may generate $p_{\rho,i}$ and may be coupled to input 604 ($gen_i$) of two-operand adder structure 700. In some embodiments, generated-add structure 1300 may generate partial product bits and adds them to X, producing a sum at the outputs 614 (the XORCY outputs) of the two-operand adder structures 700. In some embodiments, generate-add structure 1300 may not use the bypass input AX/BX/CX/DX, making it available for other uses.

In some embodiments of a multiplier, nearly half of the partial-product bits may be generated using generate-add structure 1300. In some embodiments, the remaining partial product bits may be generated by other components. In some embodiments, many of these remaining partial product bits may be the $x_i$ inputs of generate-add structures 1300. In some embodiments, the sums produced by the generate-add structures 1300 and any remaining partial-product bits may be added (e.g., in a parallel tree structure) to produce the final product.

In some embodiments, the partial-product bits generated in a generate-add structure 1300 may not be from the same partial product $P_\rho$. For pairs of adjacent partial-product bits that can be generated using a single LUT6, it may be advantageous to generate those bits externally (e.g., using other components) and instead use generate-add structure 1300 to generate partial-product bits from a different row (but the same column) that cannot be generated with another partial-product bit in a single LUT6.

Figure 14:
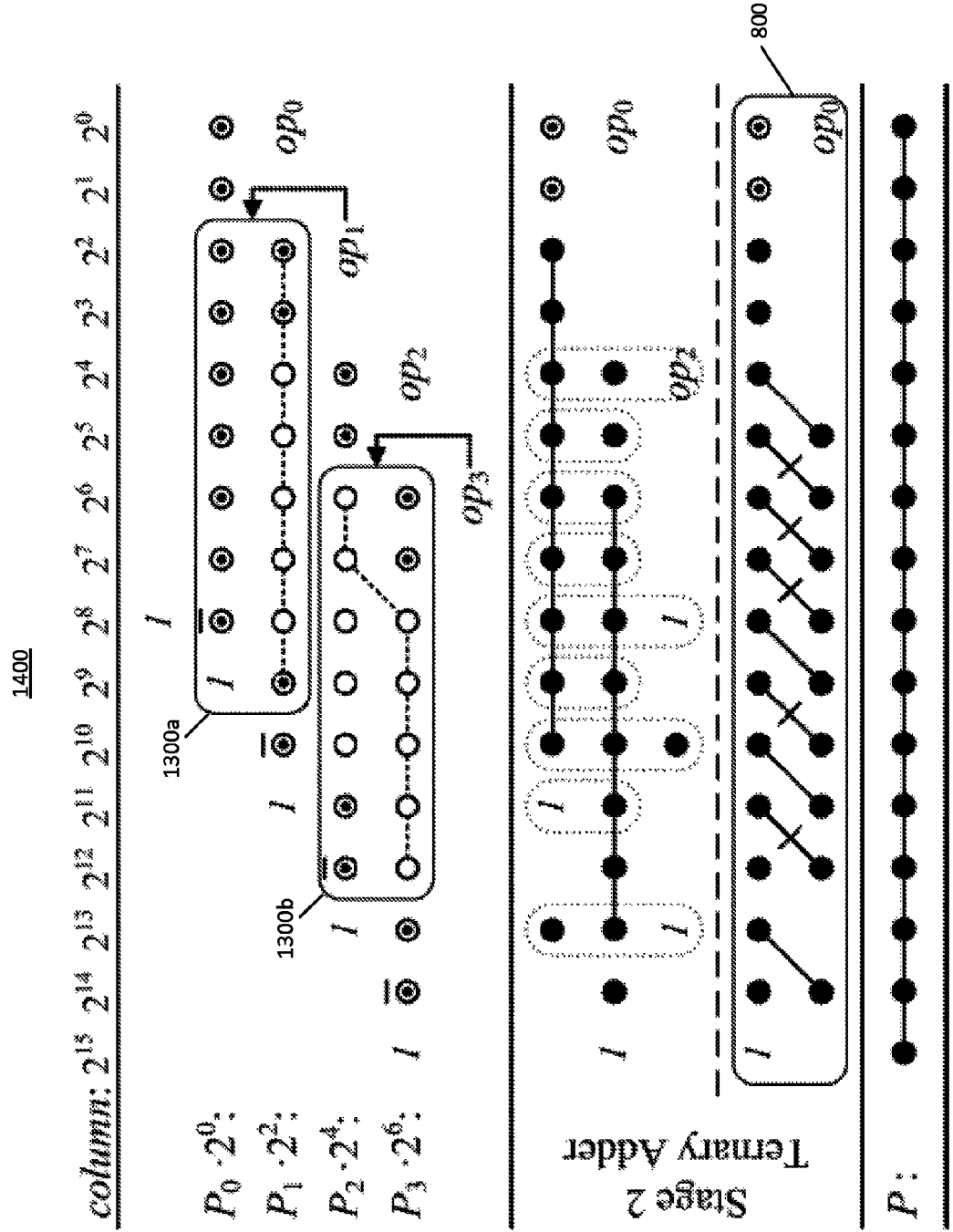
FIG. 14 is a dot diagram of an 8 bit by 8 bit multiplier, according to some embodiments.

2. First Stage Addition: FIG. 14 shows a dot diagram of an 8×8 multiplier 1400, according to some embodiments. Dot diagrams are used to show the structure of a design. In some embodiments, the partial-product matrix of FIG. 4C is represented in the first stage, using circles to represent partial-product bits. In some embodiments, a single LUT6 may generate two adjacent partial-product bits that are indicated as circles with a dot inside, such as $p_{0,1}$ and $p_{0,0}$. In some embodiments, a single LUT6 may generate only one partial-product bit indicated by a hollow circle, such as $p_{1,2}$.

In some embodiments, generate-add structures (e.g., generate-add structures 1300a-b) may be used to add many (e.g., most) bits in the first stage. Bits that may be added by a generate-add structure are indicated in dot diagram 1400 by enclosing those bits in a rounded rectangle. In some embodiments, bits inside a rounded rectangle that are connected by a dotted line may be generated by the generate-add structure while the remaining bits are generated externally to the generate-add structure and wired to the I6 inputs of the generate-add structure. In some embodiments, the CIN input to the least-significant column of a generate-add structure may be used to add an extra bit, as indicated in dot diagram 1400 by an arrow from the extra bit to the rounded rectangle. For example, $op_1$ may be input to the CIN input of the first generate-add structure in some embodiments of the 8×8 multiplier. In dot diagram 1400, sum bits that were produced by the fast carry chain of the same generate-add structure are indicated in the next state using solid dots with a horizontal line through them. In some embodiments, the two LSBs in $P_0$ may not be generated in the first stage; instead, they may be brought down into the second stage without modification. In some embodiments, the remaining partial-product bits (indicated in dot diagram 1400 by solid dots) may be generated in the second stage.

The length of each generate-add structure in a multiplier may depend on several factors. In some embodiments, for an m-bit multiplicand, (m−1)-bit generate-add structures may be the initial choice, adding $(p'_{i,m} \ldots p_{i,2})+(P_{i+1,m-2} \ldots p_{i+1,0})$. In dot diagram 1400, the second generate-add structure in the first stage is an example of this technique, adding $(p'_{2,8} \ldots p_{2,2})+(p_{3,6} \ldots p_{3,0})$. In dot diagram 1400, the first generate-add structure in the first stage is extended by one bit to avoid increasing the maximum height in the second stage to four, adding $(1 \ p'_{0,8} \ldots p_{0,2})+(p_{1,7} \ldots p_{1,0})$. As shown in Section II(A), some embodiments of two-operand adder structure 700 may generate one bit that is a function of five variables and add that bit to another bit that is connected to input 504 (the I6 input). As discussed in Section III(B), any single bit of a radix-4 modified-Booth partial-product may be computed using 5 inputs or less. So, in some embodiments, the general structure for partial-product generation and addition in the first stage may be to generate one bit in each LUT6 of a generate-add structure, compute the remaining bits using separate LUT6s, and bring these remaining bits into the inputs 504 of the generate-add structure (the I6 inputs of the LUT6s).

Figure 15:
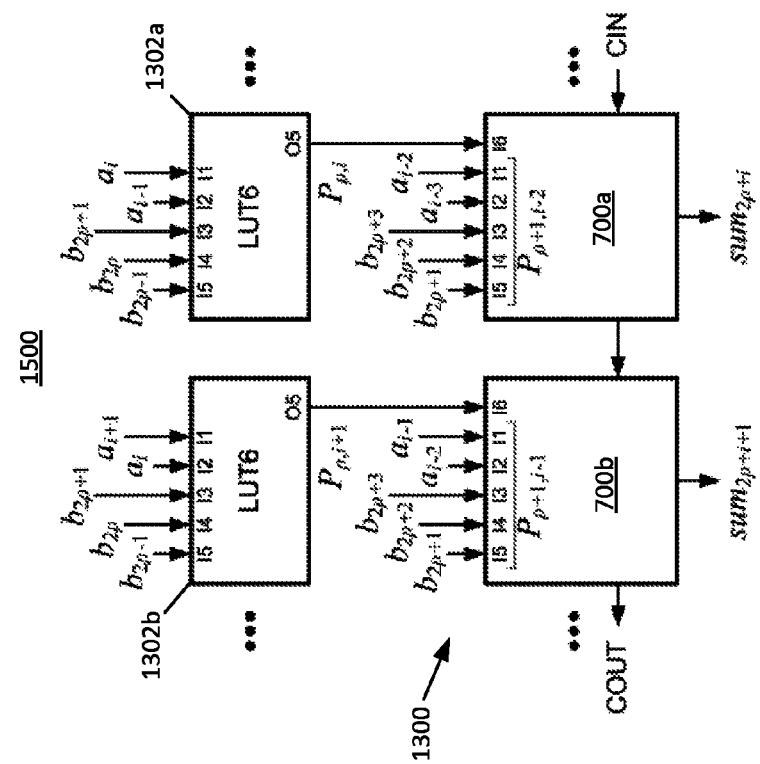
FIG. 15 is a schematic of a circuit configured to generate and add two rows of partial products, according to some embodiments.

This technique is shown in FIG. 15. FIG. 15 shows a schematic of a circuit 1500 configured to generate and add two rows of partial products, according to some embodiments. In some embodiments, circuit 1500 may include a generate-add structure 1300 with external LUTs 1302 to produce partial-product bits which are wired to the $x_i$ inputs of the generate-add structure 1300. In the example of FIG. 15, each LUT6 1302 may produce a single partial product bit. A specific example would be generating $p_{3,3}$ and $p_{3,2}$ in the LUT6s of the generate-add structure 1300 and adding them to $p_{2,5}$ and $p_{2,4}$, which are generated in separate LUT6s 1302. In some embodiments, the structure of circuit 1500 may be very compact, regular, and easy to place and route on the FPGA fabric. In some embodiments, the structure of circuit 1500 may work well with the Spartan-6 which has fast carry logic only on every other column of slices.

As described in Section III(B), some adjacent partial-product bits may, in some embodiments, be generated in pairs using a single LUT6. These bits are indicated in the dot diagrams as circles with a dot inside. In some embodiments, when possible, a single LUT6 is used to generate two of these bits, which frees one LUT6 from the general structure for other purposes.

Figure 16:
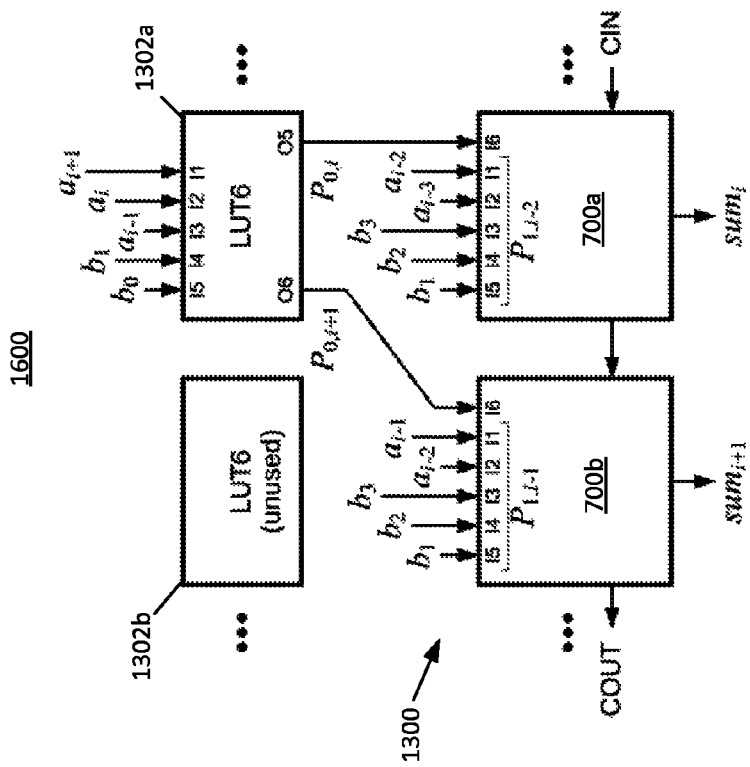
FIG. 16 is a schematic of a circuit configured to generate and add two rows of partial products, according to some embodiments.

This technique is shown in FIG. 16. FIG. 16 shows a schematic of a circuit 1600 configured to generate and add two rows of partial products, according to some embodiments. In the example of FIG. 16, two bits in $P_0$ may be generated using one LUT6 1302a and added to two bits of $P_1$. In general, the partial products with the most variables may be generated in the LUT6s in the generate-add structure 1300 to increase the number of pairs of bits that may be generated in the stand-alone LUT6s 1302. For example, when generating and adding $(p_{2,3} \ p_{2,2})$ to $(p_{3,1} \ p_{3,0})$, $P_{2,3}$ and $p_{2,2}$ may be generated in the generate-add structure 1300.

Figure 17:
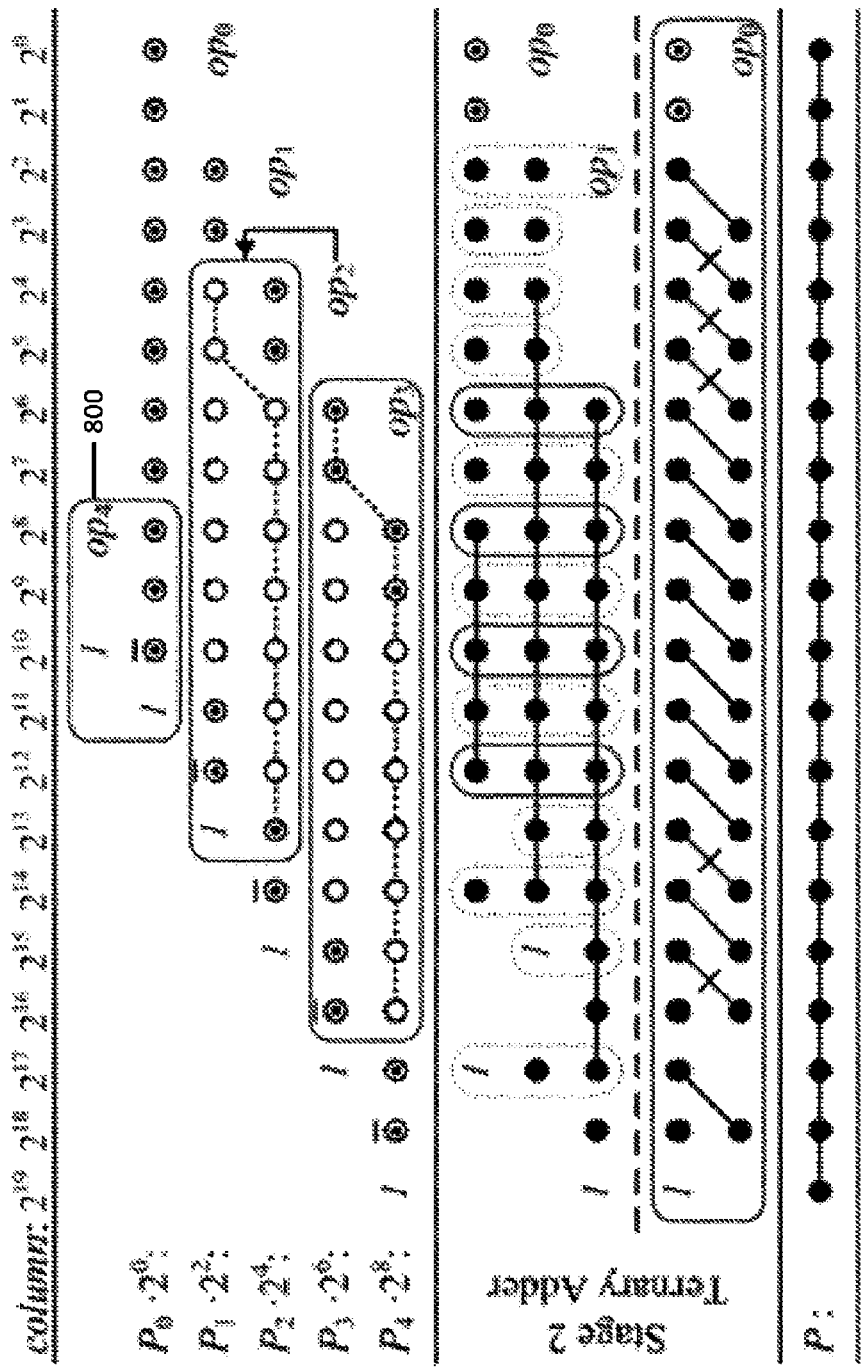
FIG. 17 is a dot diagram of a 10 bit by 10 bit multiplier, according to some embodiments.

FIG. 17 shows a dot diagram 1700 of a 10 bit by 10 bit multiplier, according to some embodiments. In some embodiments, the addition of $(1 \ 1 \ 0 \ \text{op}_4)+(p'_{0,10} \ p_{0,9} \ p_{0,8})$ may be performed using a small two-operand adder 800 indicated by a rounded rectangle. In some embodiments, the result may be passed to the second stage, indicated by solid dots with a horizontal line through them. In some embodiments, the remaining bits of $P_0$ may be generated using one LUT6 for each pair of bits and passed to the second stage, indicated by solid dots without a horizontal line. In some embodiments, many (e.g., most) of the remaining partial-product bits may be generated and added using generate-add structures, using the techniques described above with reference to the 8 by 8 multiplier.

Figure 18:
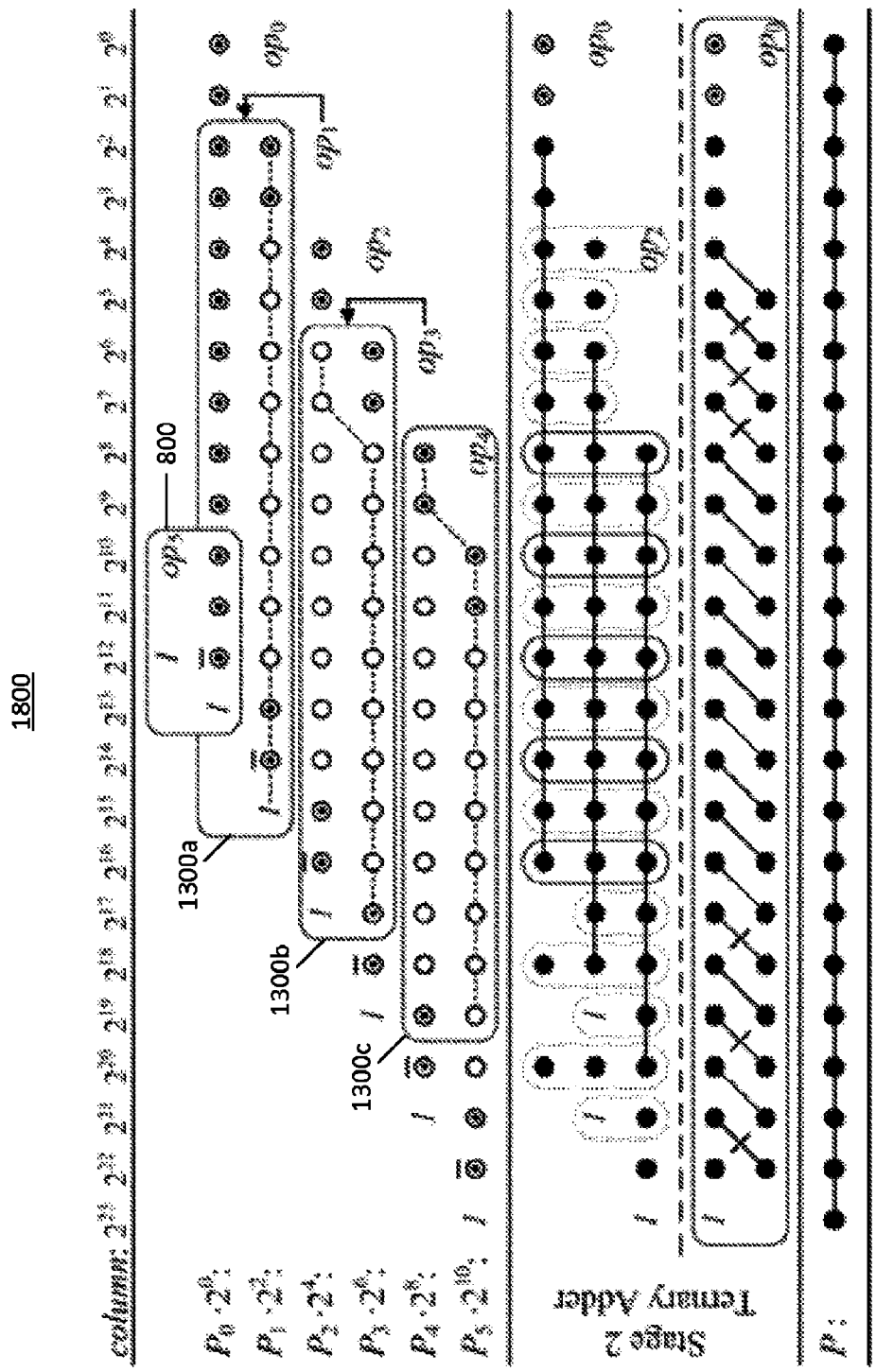
FIG. 18 is a dot diagram of a 12 bit by 12 bit multiplier, according to some embodiments.

FIG. 18 shows a dot diagram 1800 of a 12 bit by 12 bit multiplier, according to some embodiments. In some embodiments, many (e.g., most) of the partial-product bits may be generated and added using three generate-add structures 1300a-c. The addition of $(1 \ 1 \ 0 \ \text{op}_5)+(p_{0,12} \ p_{0,11} \ p_{0,10})$ may be performed using a small two-operand adder 800, and the result may be input to the first generate-add structure 1302a. This technique may limit the maximum height of stage 2 to three bits.

3. Subsequent Addition: As shown in FIG. 14, some embodiments of the 8 by 8 multiplier may include three rows of partial products in the second stage, which may be added using a ternary adder (e.g., ternary adder 1000) to produce the final sum. In some embodiments, the ternary adder may use full adders and half adders to generate a sum and a carry vector which may then be added using a two-operand adder 800. In FIG. 14, the two-operand adder 800 is indicated by a rounded rectangle. In FIG. 14, bits that may be added using the full and half adders are circled, with dotted circles indicating full and half adders that may be absorbed into the two-operand adder 800 (rather than being generated by an external LUT6). In FIG. 14, the sum and carry bits produced by the full and half adders are indicated inside the rounded rectangle 800 by solid dots connected by a diagonal line. In FIG. 14, the sum and carry bits of the half adder are distinguished by a small slash through the diagonal line. In some embodiments of an 8 by 8 multiplier, logic for all of the full and half adders may be absorbed into the LUT6s of the two-operand adder 800, so the ternary adder may use the same resources as two-operand adder 800.

In some embodiments, the 10 by 10 and 12 by 12 multipliers may have three rows of partial products in the second stage, which may be added using a ternary adder (e.g., a ternary adder 1000). In some embodiments of the 10 by 10 multiplier and/or 12 by 12 multiplier, the ternary adder may implement some of the full adders using extra LUT6s, and may absorb some (e.g., a majority) of the full and half adders into the two-operand adder.

Figure 19:
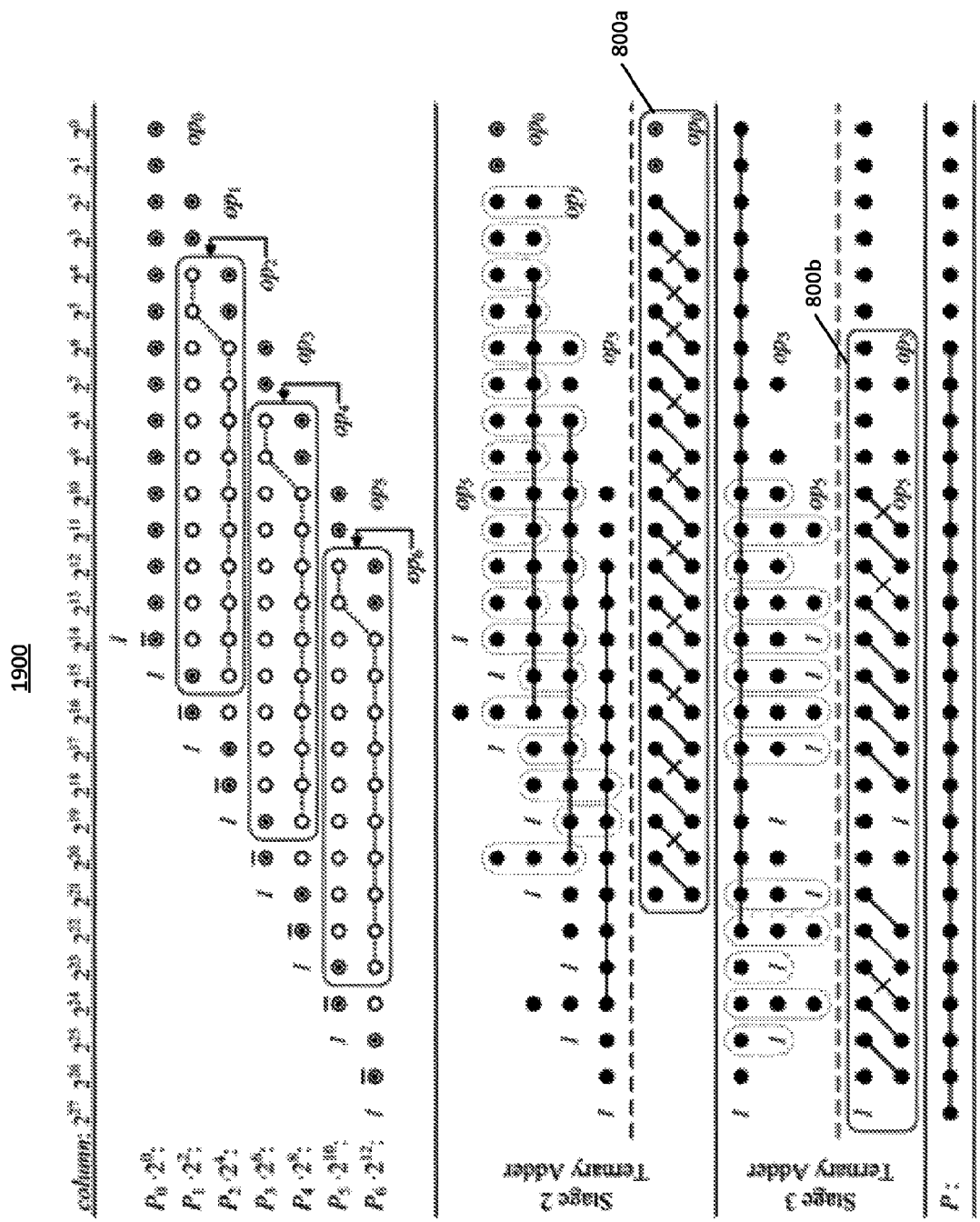
FIG. 19 is a dot diagram of a 14 bit by 14 bit multiplier, according to some embodiments.

FIG. 19 shows a dot diagram 1900 of a 14 bit by 14 bit multiplier, according to some embodiments. In some embodiments, the 14×14 multiplier may have five rows of partial products in the second stage, which may be reduced to three rows using a ternary adder (e.g., ternary adder 1000). Starting at the least-significant column and working toward more-significant columns, full and half adders may be used to reduce the height of each column to three bits or less, according to some embodiments. In some embodiments, when possible, full adders are not used in adjacent columns, thereby increasing the number of full and half adders that may be absorbed into the two-operand adder logic. In some embodiments, variable partial-product bits in stage 2 may be given preference for addition over constant '1's. In some embodiments, a two-operand adder 800a reduces the full and half adders to a single row of bits in stage 3, indicated by solid dots with a horizontal line connecting them. In some embodiments, in stage 3, a ternary adder (e.g., a ternary adder 1000) may be used to reduce the three rows of partial-products to the final output. In some embodiments, passing constant '1's from stage 2 to stage 3 may increase the number of special half adders that are used, which may increase the number of full and half adders that are absorbed into two-operand adder 800b. In some embodiments of the 14×14 multiplier, all of the full and half adders in both ternary adder stages may be absorbed into the two-operand adders 800a-b. Thus, in some embodiments, the five rows of partial products in stage 2 may be reduced to a single row using the same resources as two separate two-operand adders 800.

Figure 20:
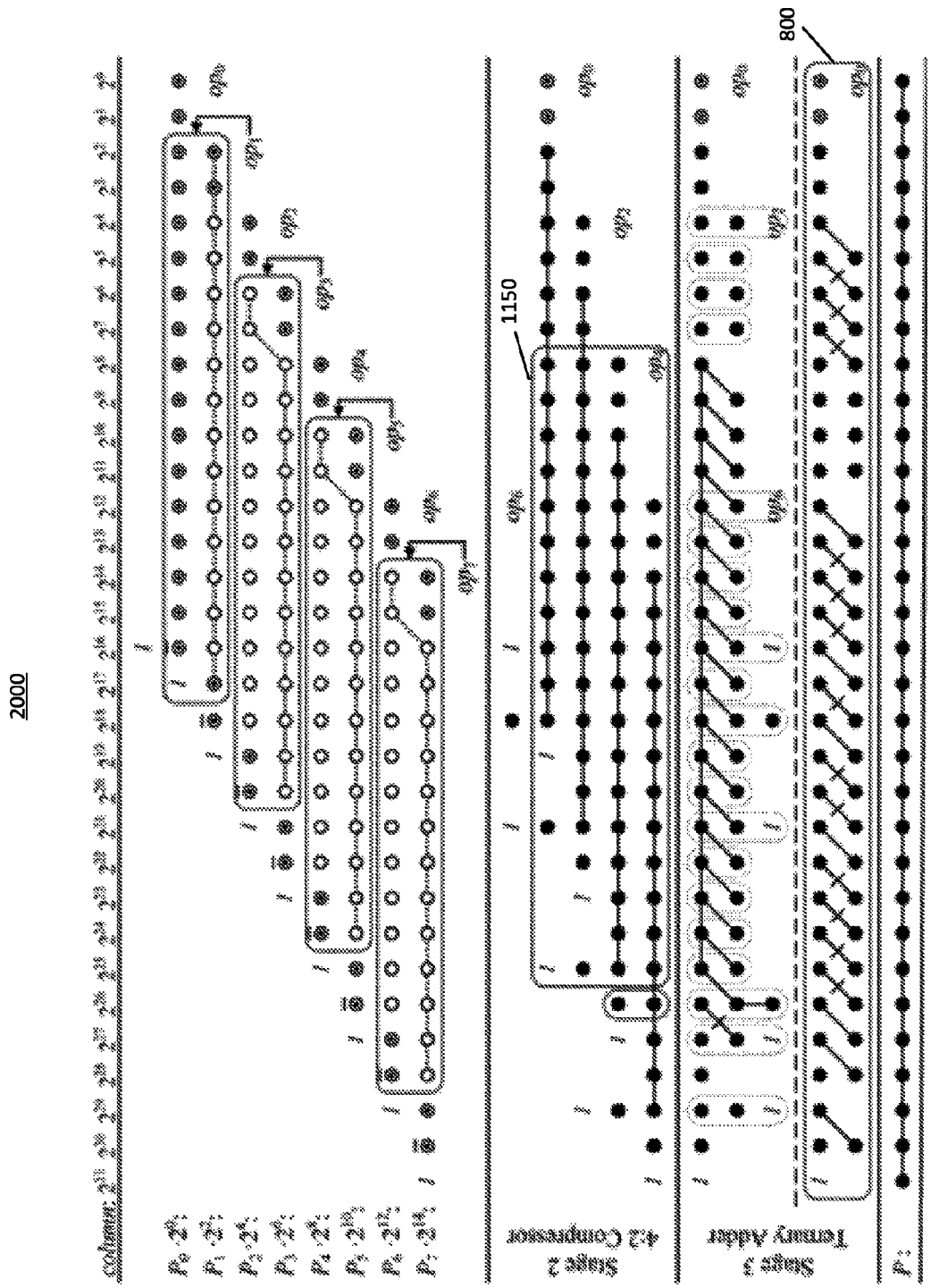
FIG. 20 is a dot diagram of a 16 bit by 16 bit multiplier, according to some embodiments.

FIG. 20 shows a dot diagram 2000 of a 16 bit by 16 bit multiplier, according to some embodiments. In some embodiments, 16×16 multiplier may have five rows of partial products in the second stage, which may be reduced to two rows using a 4:2 compressor (e.g., a 4:2 compressor 1150). In some embodiments, since the $2^7$ column and less significant columns have a height of three or less, they may be added in the third stage using a ternary adder (e.g., a ternary adder 1000). In some embodiments, starting in the $2^8$ column, the 4:2 compressor may be used. In some embodiments, each column of the 4:2 compressor may produce a sum bit and a carry bit that may be passed to the third stage. In FIG. 20, the output of the 4:2 compressor is indicated by solid dots with diagonal lines connecting the sum and carry bits that were generated in the same column, plus a horizontal line through the top row. In some embodiments, the most-significant column of the 4:2 compressor may produce an extra carry bit at output 612 (the output of the MUXCY), which may be indicated by an additional solid dot connected by a vertical line to the other carry bit. In some embodiments, a half adder may be used in the $2^{26}$ column so the extra carry bit does not increase the height beyond three bits. In some embodiments, the third stage may use a ternary adder (e.g., a ternary adder 1000) to produce the final product. In some embodiments, all of the logic for the full and half adders used in the third stage may be absorbed into the LUT6s of two-operand adder 800.

In some embodiments, the structures for second and subsequent stage addition may be compact, regular, and/or easy to place and route on the FPGA fabric. In some embodiments of the 14×14 multiplier, the stage 2 and stage 3 ternary adders may not be placed in adjacent slices in the Spartan-6 because the ternary adders may both require fast carry logic; however, this is not the case with the other FPGA families. In some embodiments of the 16×16 multiplier, the stage 2 4:2 compressor and the stage 3 ternary adder may not be placed in adjacent slices for the same reason.

D. Constant Coefficient Multiplier (KCM)

A constant coefficient multiplier (KCM) may calculate the product of an input operand B and a constant coefficient A. In some embodiments, a KCM may comprise one or more two-operand adder structures and/or generate-add structures.

Some embodiments of KCMs are described below. In the discussion below, it is assumed that A is an m-bit two's complement number and B is an n-bit two's complement number. However, some embodiments are not limited in regards to the length or encoding of the KCM's operands. In some embodiments, the KCM's operands may be signed and/or unsigned. In some embodiments, m may be any suitable number of bits, and n may be any suitable number of bits. In some embodiments, m and n may be equal or unequal.

In embodiments where A is an m-bit two's complement number and B is an n-bit two's complement number, A and B may be represented as follows:

$$A = -a_{m-1} \cdot 2^{m-1} + \sum_{i=0}^{m-2} a_i \cdot 2^i \tag{22}$$

$$B = -b_{n-1} \cdot 2^{n-1} + \sum_{j=0}^{n-2} b_j \cdot 2^j. \tag{23}$$

Thus, the product P of A*B may be represented as follows:

$$P = a_{m-1}b_{n-1} \cdot 2^{m+n-2} + \sum_{i=0}^{m-2}\sum_{j=0}^{n-2} a_i b_j \cdot 2^{i+j} + \sum_{i=0}^{m-2} \overline{b_{n-1}a_i} \cdot 2^{i+n-1} + \sum_{j=0}^{n-2} \overline{a_{m-1}b_j} \cdot 2^{j+m-1} + 2^{m+n-1} + 2^{n-1} + 2^{m-1}. \tag{24}$$

Figure 21:
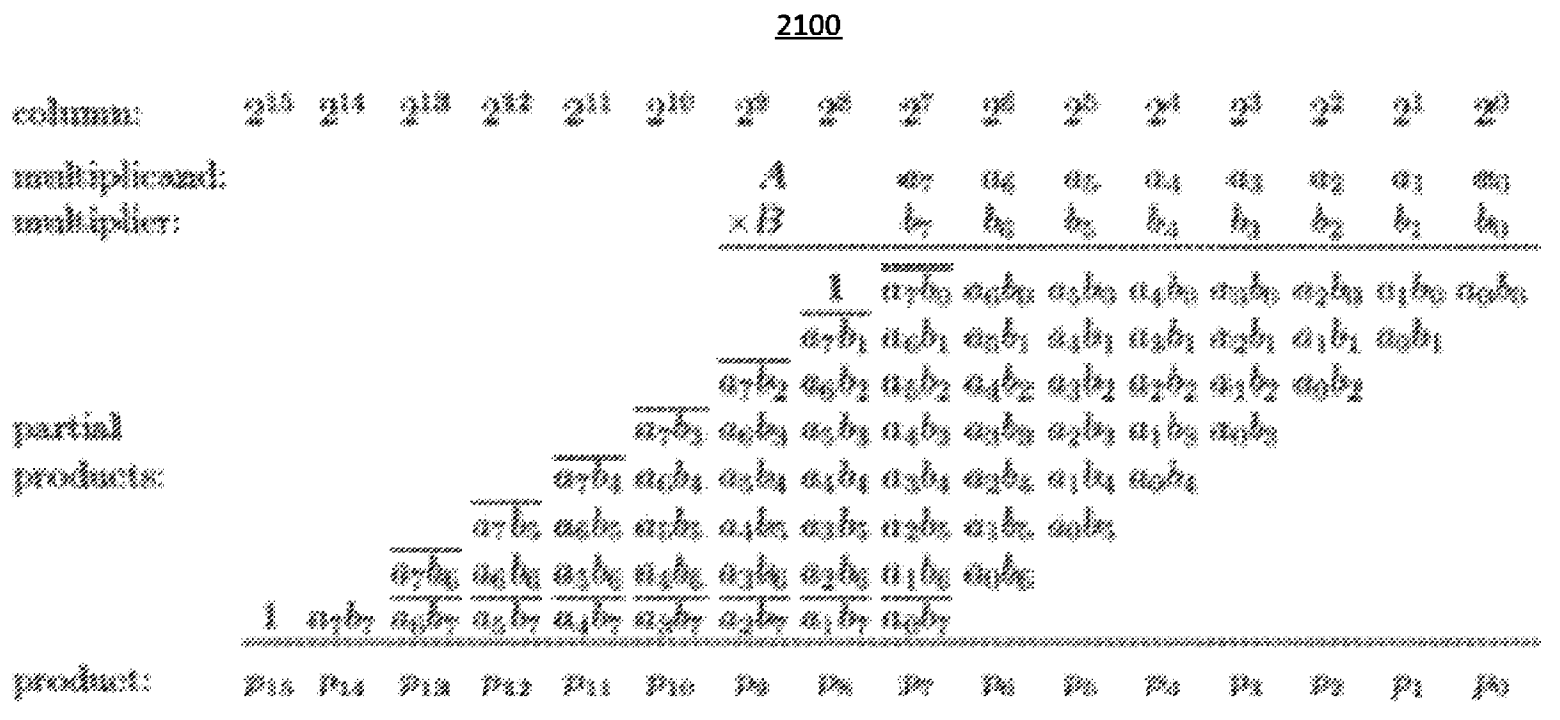

FIG. 21 shows a dot diagram 2100 of an 8-bit by 8-bit KCM, according to some embodiments. In the example of FIG. 21, A is a constant of length m bits, B is a variable of length n bits, and m=n=8.

Figure 22:
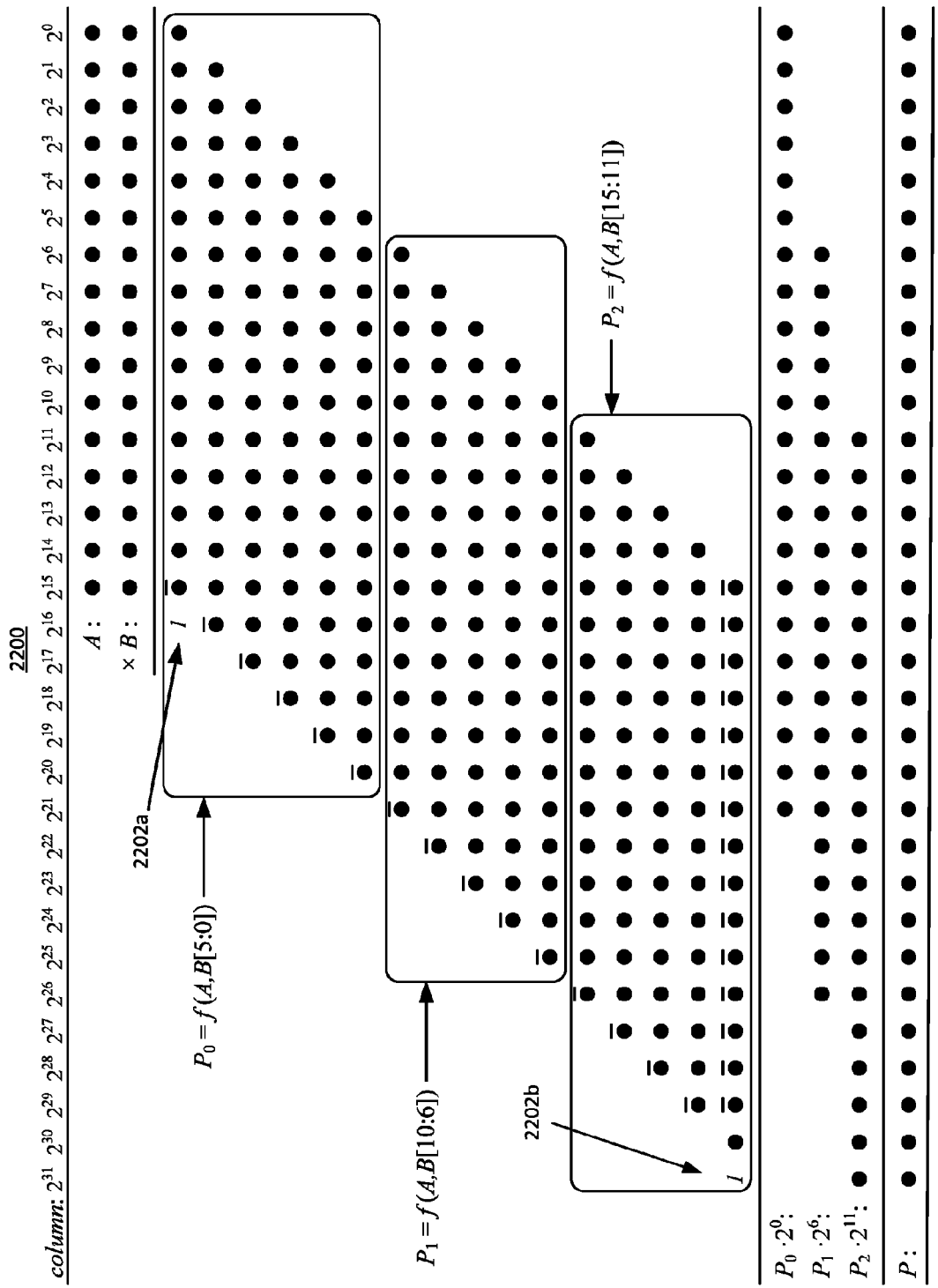
FIG. 22 is a dot diagram of a 16-bit by 16-bit constant coefficient multiplier (KCM), according to some embodiments.

FIG. 22 shows a dot diagram 2200 of a 16-bit by 16-bit KCM, according to some embodiments. In the example of FIG. 22, A is a constant of length m bits, B is a variable length n bits, and m=n=16. In the example of FIG. 22, each dot represents a partial product bit, and each dot with a line above it represents a complemented partial product bit. As shown in FIG. 22, the first six rows of partial product bits may, in some embodiments, be added to produce a partial product, $P_0$, which is a function of A and the six least-significant bits (LSBs) of B, B[5:0]. As shown in FIG. 22, the next five rows of partial product bits may, in some embodiments, be added to produce a partial product, $P_1$, which is a function of A and five bits of B, B[10:6]. As shown in FIG. 22, the last five rows of partial product bits may, in some embodiments, be added to produce a partial product, $P_2$, which is a function of A and the five most-significant bits (MSBs) of B, B[15:11]. Each constant '1' (e.g., 2202) may be added with any partial product as long as the '1' remains in the same column. In some embodiments, the partial products $P_0$, $P_1$, and $P_2$ may be added to produce the final product P=A*B.

Figure 23:
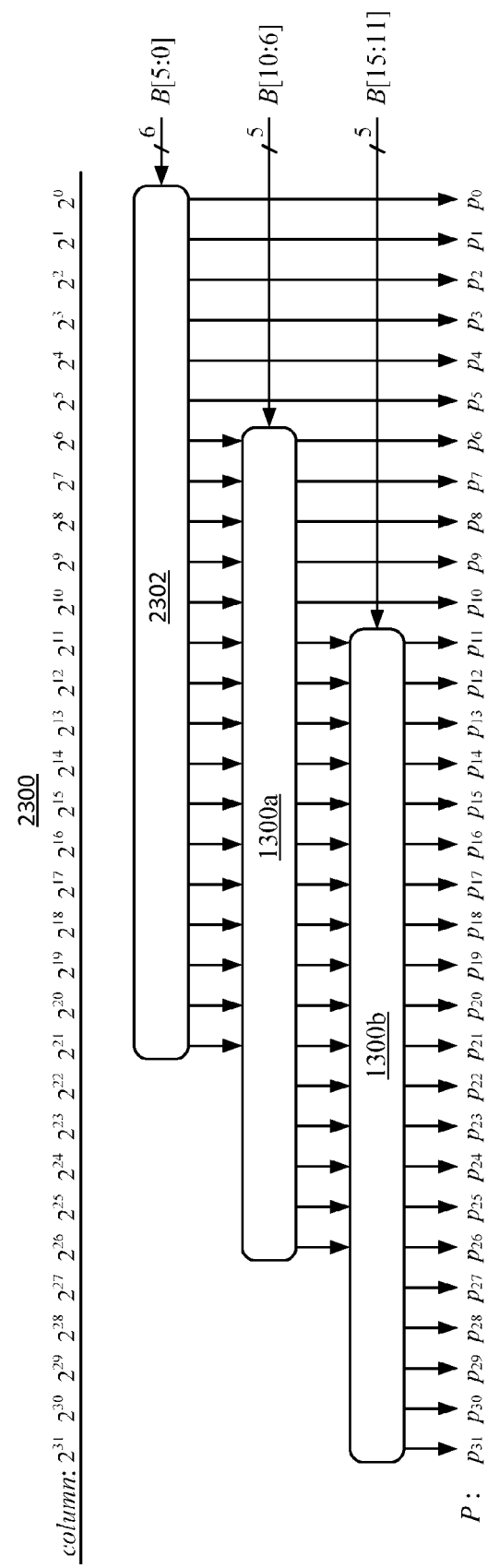
FIG. 23 is a schematic of a 16-bit by 16-bit KCM 2300, according to some embodiments.

FIG. 23 shows a schematic of a 16-bit by 16-bit KCM 2300, according to some embodiments. In some embodiments, KCM 2300 may multiply a constant A of length m bits and a variable B of length n bits. In the example of FIG. 23, n=m=16. In some embodiments, KCM 2300 may implement the dot diagram of FIG. 22.

In some embodiments, a set of LUT6s 2302 may provide the value of partial product $P_0$ based on bits B[5:0] of the variable input B. As shown in FIG. 22, $P_0$ may, in some embodiments, be a function of A (a constant) and six variable bits of B (B[5:0]). A function of six variable bits may have 64 possible values. In some embodiments, the 64 possible values of $P_0$ may be pre-computed and stored in the set of LUT6s 2302.

In some embodiments, a generate-add structure 1300a may generate the value of partial product $P_1$ based on bits B[10:6] of variable input B, and may add the bits of $P_1$ and $P_0$ that are in the same column. Since $P_1$ is a function of five variable bits, $P_1$ may, in some embodiments, have 32 possible values. In some embodiments, these values may be pre-computed and stored in the LUTs of the generate-add structure 1300*a* (e.g., in LUT6s and/or in LUT5s).

In some embodiments, a generate-add structure 1300*b* may generate the value of partial product $P_2$ based on bits B[15:11] of variable input B, and may add the bits of $P_2$ and ($P_1+P_0$) that are in the same column. Since $P_2$ is a function of five variable bits, $P_2$ may, in some embodiments, have 32 possible values. In some embodiments, these values may be pre-computed and stored in the LUTs of the generate-add structure 1300*b* (e.g., in LUT6s and/or in LUT5s). In some embodiments, the constant '1's 2202 may be included in the pre-computed values that are stored in generate-add structure 1300*b*.

In some embodiments, a third generate-add structure 1300 may be substituted for the set of LUT6s 2302 in KCM 2300. In some embodiments, the third generate-add structure may generate the value of partial product $P_0$ based on bits B[5:0] and add an input C to partial product $P_0$. In some embodiments, the substitution of the third generate-add structure for the set of LUT6s 2302 may facilitate conversion of the KCM 2300 into a fused KCM-adder unit.

In some embodiments, the length of variable B may be less than n=16 bits. In embodiments where the length of variable B is less than n=16 bits, a set of LUT5s may be substituted for the set of LUT6s 2302 in KCM 2300. In cases where P has less than 16 bits, P0 may, in some embodiments, be a function of five or fewer variable bits, and therefore may have 32 or fewer possible values. In some embodiments, these values may be pre-computed and stored in the set of LUT5s.

In some embodiments, any suitable lookup structure (e.g., a block RAM in an FPGA) may be substituted for set of LUT6s 2302 in KCM 2300. In some embodiments, the substitute lookup structure may generate a partial product based on seven or more variable bits of B, thereby reducing the resources required to generate and add the other partial products in the other portions of KCM 2300.

In some embodiments, the array-based structure of KCM 2300 may be extended (e.g., by adding one or more generate-add structures 1300) to enable the KCM to handle operands having lengths greater than 16 bits.

In some embodiments, a KCM may be implemented using a tree structure. As just one example, a tree-based KCM may be configured to multiply a constant A of length m=20 bits and a variable B of length n=20 bits. In some embodiments, a first set of LUT5s may generate partial product $P_0$=f(A, B[4:0]). In some embodiments, bits of partial product $P_0$ may be input to a first generate-add structure, which may generate partial product $P_1$=f(A, B[9:5]) and add bits of $P_0$ and $P_1$ to produce a sum $S_1$. In some embodiments, a second set of LUT5s may generate partial product $P_2$=f(A, B[14:10]). In some embodiments, bits of partial product $P_2$ may be input to a second generate-add structure, which may generate partial product $P_3$=f(A, B[19:15]) and add bits of $P_2$ and $P_3$ to produce a sum $S_2$. In some embodiments, the bits of sum $S_1$ and sum $S_2$ may be input to a two-operand adder, which may add $S_1$ and $S_2$ to produce product P. In some embodiments, one or more of the partial products may be a function of A, bits of B, and one or more constant '1's.

IV. Other Circuits and Techniques

Techniques for using generate-add structures to make a parallel tree multiplier have been described. In some embodiments, generate-add structures may be used to make array and/or serial multipliers.

Figure 24:
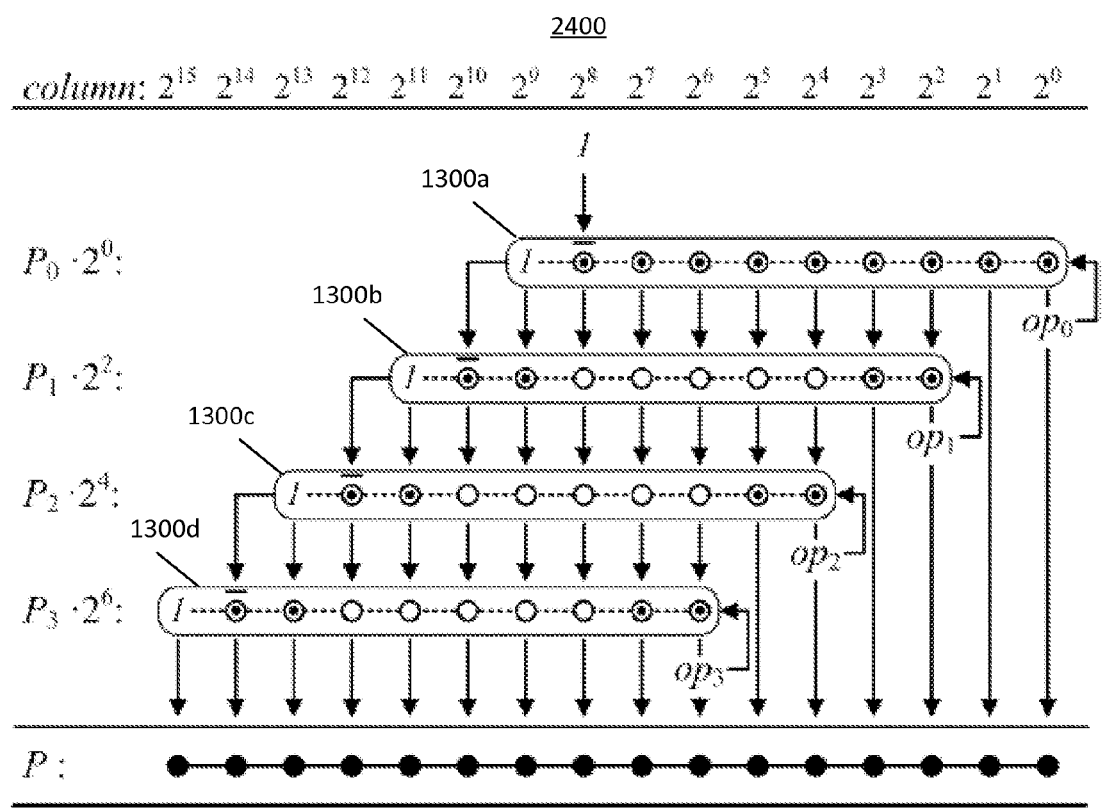
FIG. 24 is a dot diagram of an 8 bit by 8 bit array multiplier, according to some embodiments.

In some embodiments, each row of partial products, $P_\rho$, may be generated by a separate generate-add structure. In some embodiments, the generate-add structures may be cascaded, with the outputs of the row p structure coupled to the inputs of the row ρ+1 structure, and with an appropriate hard-wired shift, to form an array multiplier. FIG. 24 shows a dot diagram 2400 of an 8 bit by 8 bit array multiplier, according to some embodiments. In some embodiments, the generate-add structure 1300 of each row p may be the same, indicated by a rounded rectangle and a dotted line through the generated partial products. In some embodiments, the operation bit for each row, $op_\rho$, may be coupled to the carry-in of the generate-add structure in the corresponding row ρ. In some embodiments, the two least-significant outputs of each generate-add structure 1300 may be bits of the final product. In some embodiments, the remaining sum outputs may be coupled to the inputs of the generate-add structure 1300 in the next row. In some embodiments, the carry-out of each generate-add structure 1300, except the last generate-add structure (structure 1300*d* in the example of FIG. 24), may be coupled to the inputs of the generate-add structure in the next row. In some embodiments, an external number may be added to the $P_0$ generate-add structure 1300*a*, or the $P_0$ bits may be generated using external LUTs instead of using a generate-add structure.

Figure 25:
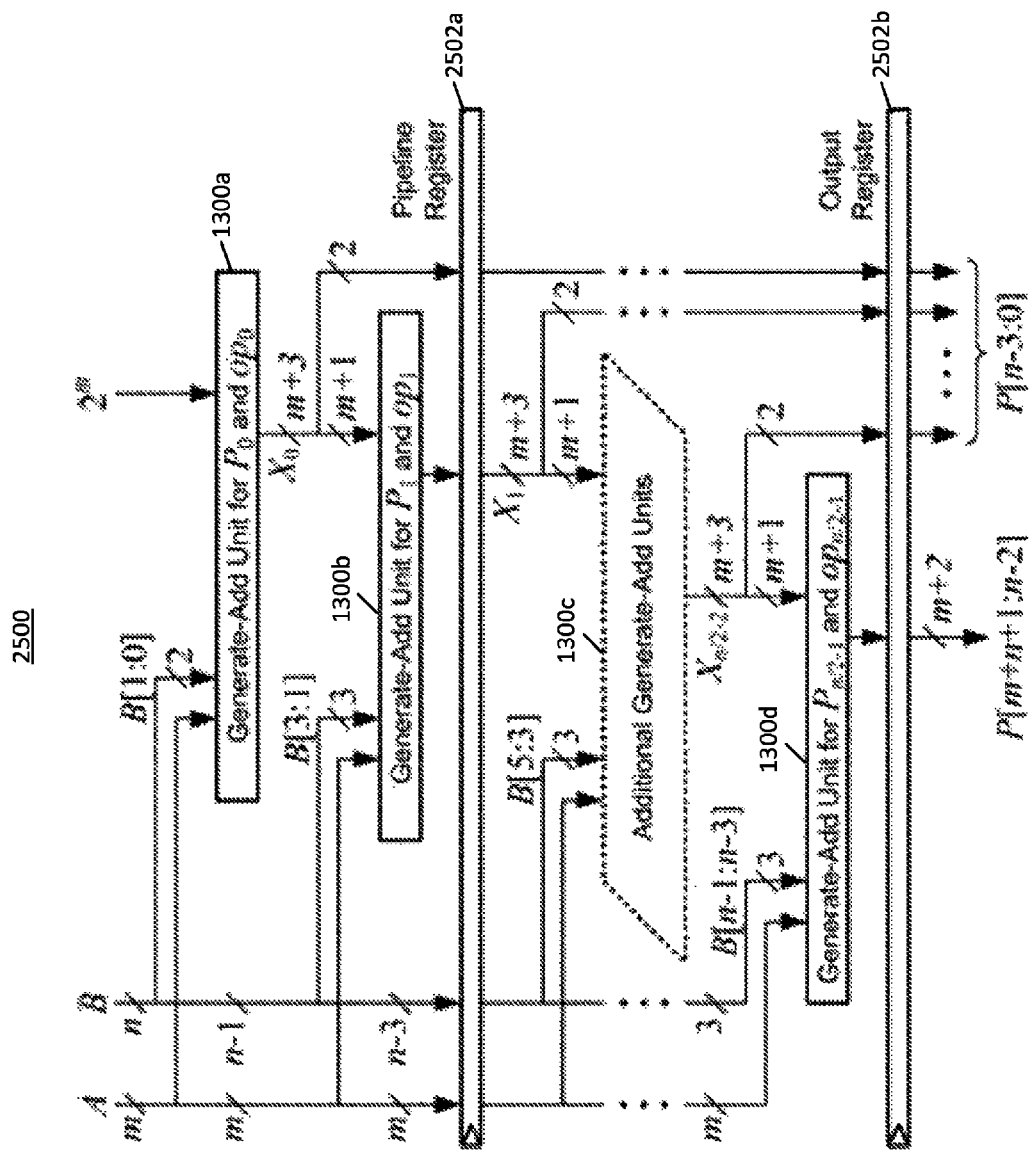
FIG. 25 is a schematic of m-bit by n-bit array multiplier, according to some embodiments.

FIG. 25 shows a schematic of m-bit by n-bit array multiplier 2500, according to some embodiments. In some embodiments, m×n array multiplier 2500 may be pipelined. In the example of FIG. 25, pipeline registers are inserted after each set of two generate-add structures 1300. Embodiments are not limited in this regard. In some embodiments, an m×n array multiplier may not be pipelined. In some embodiments, pipeline registers may be inserted after each generate-add structure 1300, after each set of three or more generate-add structures 1300, or in any other suitable configuration.

In some embodiments, a pipelined m×n array multiplier 2500 may comprise two or more generate-add structures 1300 and one or more registers 2502. In some embodiments, multiplier 2500 may multiply two operands A and B to obtain a product P, where operand A has a length of m bits, operand B has a length of n bits, and operand P has a length of up to m+n+2 bits. In some embodiments, m bits of operand A and two bits B[1:0] of operand B may be input to first generate-add structure 1300*a*, which may generate term $X_0$ (partial product $P_0$ and $op_0$) of length m+3 bits. In some embodiments, the two LSBs of term $X_0$ may be coupled to first register 2502*a*, and the remaining bits of term $X_0$ may be input to second generate-add structure 1300*b*, along with the m bits of operand A and three bits B[3:1] of operand B. In some embodiments, second generate-add structure 1300*b* may generate term $X_1$ (partial product $P_1$ and $op_1$) of length m+3 bits.

In some embodiments, the m bits of operand A, the n−3 MSBs of operand B, the m+3 bits of term $X_1$, and the two LSBs of term $X_0$ may be stored in register 2502*a* at the end of the first stage of multiplier 2500. Thus, the number of bits stored in register 2502*a* may be m+(n−3)+(m+3)+2=2m+n+2 bits. In some embodiments, each subsequent stage of multiplier 2500 may register four fewer bits of B and four additional LSBs produced by the generate-add units 1300. Thus, in some embodiments, each stage may include a pipeline register of width 2m+n+2 bits. In some embodiments, a pipeline register of width 2m+n+2 bits may be implemented using 2m+n+2 flip-flops. In some embodiments, the two generate-add units in each pipeline stage may be implemented using 2(m+2) LUTs=4m+8 flip-flops. In cases where m≥n, at least m+6 flip-flops may be available in each stage for other uses.

In some embodiments, product P of multiplier 2500 may be truncated or rounded. In embodiments where P is truncated or rounded, a suitable number of LSBs produced by the generate-add units 1300 may not be registered, and the widths of the pipeline registers 2502 may be reduced accordingly, thereby providing additional unused flip-flops in each stage.

Figure 26:
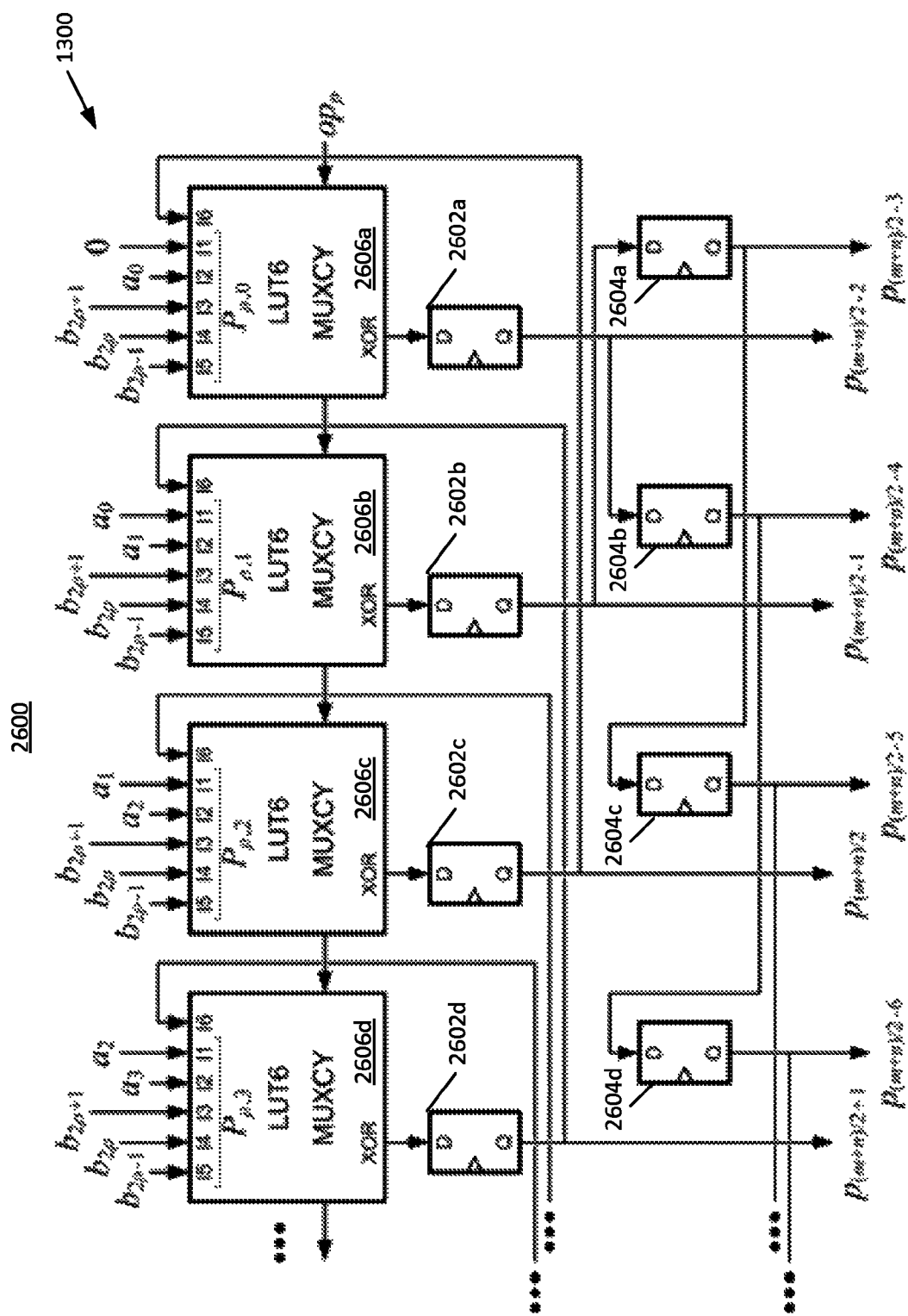
FIG. 26 is a schematic of a serial multiplier, according to some embodiments.

In some embodiments, a generate-add structure may be used to form a radix-4 serial multiplier. FIG. 26 shows a schematic of a serial multiplier 2600, according to some embodiments. In some embodiments, serial multiplier 2600 may include two flip-flops 2602, 2604 associated with each LUT6/MUXCY/XORCY group 2606. In some embodiments, the flip-flops in the same slices as the generate-add structure 1300 may be used as an accumulator for serial multiplier 2600, and the accumulator output may be coupled to the X inputs of the generate-add structure (e.g., with an appropriate hard-wired shift). In some embodiments, the flip-flops 2602 coupled to the XORCY outputs may form the most significant bits of the accumulator, and the other flip-flops 2604 may form the least significant bits of the accumulator. In some embodiments, after the appropriate number of cycles are performed, the accumulator may hold the final product. In some embodiments, using the generate-add structure 1300 of FIG. 13, the AX/BX/CX/DX bypass input may be available for each bit. In some embodiments, this availability may allow the extra flip-flops associated with each LUT6/MUXCY/XORCY group of the generate-add structure to be used to store the least significant bits of the product.

In some embodiments, tree structures or an array structure may be used to generate and add more rows of partial products. In some embodiments, such tree structures or array structures may be combined with an accumulator to form a higher-radix serial multiplier.

In some embodiments, the number of partial products may be reduced by approximately half for the special case where A=B to make squaring circuits that use fewer resources than a general-purpose multiplier to compute A×A.

In some embodiments, some of the least significant columns of partial-product bits may not be formed. This technique may reduce the resources used at the expense of accuracy, offering a design tradeoff. In some embodiments, a constant correction term and/or a variable correction term may be added to compensate for the additional error. Such multipliers may be referred to as truncated multipliers/squarers, truncated-matrix multipliers/squarers, fixed-width multipliers/squarers, etc. Techniques that do not produce the exact result or the exact correctly rounded result (e.g., truncated-matrix multiplication) fall under the umbrella of the relatively new terms approximate arithmetic, sloppy arithmetic, etc.

In some embodiments, partial products and partial sums of partial products may be combined with other sums, accumulations, products, etc. in a larger "merged arithmetic" system.

Some embodiments may be pipelined by adding pipeline registers between intermediate sums and/or between sections of carry-chains.

In some embodiments, the above-described multipliers may be significantly smaller than other multipliers on the Spartan-6, using 32% to 41% fewer LUTs than the baseline LogiCORE multipliers. In some embodiments, the above-described multipliers may be 5% to 23% faster than the baseline LogiCORE multipliers. In some embodiments, the LUT-delay product for the above-described multipliers may be significantly smaller (e.g., 39% to 52% smaller) than the LUT-delay product of the baseline multipliers. In some embodiments, the above-described multipliers may use significantly fewer MUXCYs than conventional multipliers, an advantage in the Spartan-6 because it only has fast carry logic in every other column of slices.

In some embodiments, the above-described multipliers may be significantly smaller than other multipliers on the Virtex-7, using 36% to 41% fewer LUTs than the baseline LogiCORE multipliers, and having 6% to 22% less delay than the baseline LogiCORE multipliers. In some embodiments, the above-described multipliers may be capable of performing 1.78 to 1.97 times more multiplications than the delay-optimized LogiCORE multipliers for a given number of LUTs.

The foregoing discussion describes techniques for implementing some embodiments using Xilinx FPGAs. Embodiments are not limited in this regard. Some embodiments may be implemented using any suitable FPGA, including, but not limited to FPGAs produced by Xilinx, Altera, Lattice Semicondcutor, Actel, Microsemi, SiliconBlue Technologies, Achronix, QuickLogic, or Tabula. Some embodiments may be implemented using application-specific integrated circuits (ASICs) or any other suitable processing devices.

As should be understood from the foregoing, some embodiments may include one or more lookup tables configured to generate at least a portion of an addend. Embodiments are not limited in this regard. Some embodiments may include any suitable programmable logic circuit (PLC) which can be programmed or configured to generate at least a portion of an addend, including, but not limited to, one or more lookup tables, generic array logic devices (GALs), or complex programmable logic devices (CPLDs).

The foregoing discussion describes embodiments in which programmable logic circuits having five or six inputs are configured to generate at least a portion of an addend. Embodiments are not limited to PLCs of five or six inputs. PLCs of, for example, seven, eight, nine, ten, eleven, twelve, or more inputs may be used.

Embodiments are not limited by the manner in which operands are encoded. Embodiments may process operands encoded using any suitable encoding scheme, including, but not limited to, modified Booth encoding or standard Booth encoding. The radix of the encoding scheme may 4, 8, 16, 32, any other integral power of 2, or any other suitable value.

Embodiments are not limited by the manner in which operands are represented. Embodiments may process operands represented using any suitable representations scheme, including, but not limited to, a two's complement representation scheme, an unsigned representation scheme, or a sign and magnitude representation scheme.

In some embodiments, any suitable type of multiplier apparatus may include one or more two-operand adder structures and/or generate-add structures, including, but not limited to, an array multiplier, a serial multiplier, a tree multiplier (e.g., a parallel tree multiplier), and/or a hybrid multiplier. In some embodiments, a parallel array multiplier may include two or more cascaded two-operand adder structures, with the input of at least one two-operand adder structure coupled to receive the shifted output of another two-operand adder structure. In some embodiments, a radix-4 serial multiplier may include a two-operand adder structure and an accumulator configured to shift the accumulated value and feed the shifted value back to the input of the two-operand adder structure. The accumulator may be implemented using any suitable structure, including, but not limited to, flip flops (e.g., flip-flops in a CLB slice where a generate-add structure is implemented) or a register. In some embodiments, a radix-N serial multiplier, where N is an integer power of two greater than four (e.g., 8, 16, 32), may include two or more two-operand adder structures arranged in a tree or an array with an accumulator configured to shift the accumulated value and feed the shifted value back to the input of a two-operand adder structure.

In some embodiments, a two-operand adder structure may be configured as a generate-add structure, including, but not limited to, a structure that generates a bit of a partial product from one or more inputs and adds the bit of the partial product to one or more inputs. In some embodiments, approximately 50% of the partial product bits of a multiplier are generated by one or more generate-add structures. For example, in some embodiments, approximately 50% of the partial product bits of a parallel tree multiplier are generated by one or more generate-add structures. In some embodiments, all or nearly all of the partial product bits of a multiplier are generated by one or more generate-add structures. For example, in some embodiments, all or substantially all of the partial product bits of an array multiplier or a serial multiplier are generated by one or more generate-add structures. Embodiments are not limited by the number or proportion of a multiplier device's partial-product bits that are generated using one or more generate-add structures.

In some embodiments, a two-operand adder circuit may be included in any suitable type of processing device, including, but not limited to, a multiplier device, an approximate arithmetic device, a merged arithmetic device, or a squaring device (e.g., a device configured to calculate the square of an input number).

In some embodiments, a two-operand adder structure 700 may generate a bit $y_i$, where $y_i$ is a function F of up to five bits (e.g., up to five bits applied as inputs to the two-operand adder structure via input terminal 502). In some embodiments, a LUT5 in two-operand adder structure 700 may be configured to implement the function F by mapping each possible combination of the input bits to the corresponding value of $y_i$. In some embodiments, function F may be any suitable function, including, without limitation, a function specifying a partial product, a function specifying a bit to be added by a multi-operand adder, and/or a function specifying any suitable calculation. In some embodiments, a partial product specified by function F may include, without limitation, a pre-computed partial product for a constant coefficient multiplier (KCM), a partial product for a radix-4 modified Booth multiplier, a partial product that is the sum of one or more bits that together are a function of up to five bits (e.g., bits in the partial product matrix of a multiplier circuit or a squaring circuit), and/or any other suitable partial product.

In some embodiments, a two-operand adder structure 700 may add a generated bit $y_i$ to another bit $x_i$ (e.g., a bit $x_i$ that is applied as an input to the two-operand adder structure via input terminal 504). In some embodiments, bit $x_i$ may be provided by any suitable component, including, without limitation, a LUT5, a LUT6, block RAM, an embedded multiplier, another two-operand adder structure, a generate-add structure, a ternary adder, a 4:2 compressor, a multiplier, and/or any component of an FPGA or processor. In some embodiments, bit $x_i$ may represent any suitable value, including, without limitation, a constant '0' or '1', a partial product bit, a sum bit (e.g., a sum bit generated by a two-operand adder structure, a generate-add structure, a ternary adder, or a 4:2 compressor), and/or a carry bit (e.g., a carry bit generated by a two-operand adder structure, a generate-add structure, a ternary adder, or a 4:2 compressor).

In some embodiments, a partial product bit represented by $x_i$ may include, without limitation, a pre-computed partial product bit of a KCM, a partial product computed using a radix-4 modified Booth algorithm, a partial product bit calculated using any other radix or technique, and/or any other suitable partial product. In some embodiments, two-operand adder structure 700 may invert bit $x_i$ before adding bits $x_i$ and $y_i$.

In some embodiments, two or more two-operand adder structures 700 may be coupled in a row to form a generate-add structure 1300, as illustrated in FIG. 13. In some embodiments, two or more generate-add structures 1300 may be coupled in an array structure, with the output of a first generate-add structure 1300 coupled to the inputs of a second generate-add structure 1300, and so on. In some embodiments, the input X to a generate-add structure 1300 may be by any suitable component. In some embodiments, one or more generate-add structures 1300 may be configured to implement a multiply-add or multiply-accumulate circuit.

In some embodiments, a plurality of two-operand adder structures 700 may be coupled in a tree structure to form a tree of generate-add structures, multi-bit two-operand adders, ternary adders, multi-operand adders, compressors, and/or any other suitable structures.

In some embodiments, two or more array structures and/or tree structures comprising two-operand adder structures 700 may be coupled together to form a larger system.

In some embodiments, one or more two-operand adder structures 700 may be used to form any suitable functional unit, including, without limitation, a two-operand adder (e.g., a fast two-operand adder), an array multiplier, a constant coefficient multiplier (KCM), a tree multiplier, a limited set multiplier, a serial multiplier, a multiply-add unit that computes A*B+C (e.g., using an array multiplier, a KCM, or a tree multiplier), a multiply-accumulate unit that accumulates the sum, a complex multiplier (e.g., a multiplier that multiplies two complex numbers), a complex multiply-add unit, a complex multiply-accumulate unit, a floating-point arithmetic unit (e.g., a floating point adder, subtractor, combined adder/subtractor, multiplier, and/or divider), a squaring circuit that computes $A^2=A*A$, a cubing circuit that computes $A^3=A*A*A$, an Nth power unit that computes $A^N$, a finite impulse response (FIR) filter, an infinite impulse response (IIR) filter, a discrete cosine transform (DCT) unit, an inverse discrete cosine transform (IDCT) unit, a fast Fourier transform (FFT) butterfly unit, a complete FFT unit, a wavelet transform unit, any other suitable signal processing unit, and/or a function approximation unit.

In some embodiments, a limited set multiplier may multiply a variable B by one of several constants. In some embodiments of a limited set multiplier, one input line to a generate-add structure may be used to select one of two constants, A1 or A2, and the other inputs to the generate-add structure row may be bits of the variable, B. In such embodiments, the generate-add structure may generate pre-computed values that are functions of (A1, B[k:k−3]) or (A2, B[k:k−3]) (and/or one or more constant '1's, as appropriate). In some embodiments, two input lines to a generate-add structure may be used to select one of four constants, A1, A2, A3 or A4, and the other inputs may be bits of B.

In some embodiments, a serial multiplier may include one or more generate-add structures and zero or more function generators (e.g., LUT5s, LUT6s, etc.) arranged in an array or tree structure that may be used in two or more cycles to compute a product.

In some embodiments, a function approximation unit may calculate or approximate the value of any suitable function, including, without limitation, trigonometric functions (e.g., sin(x), cos(x), tan(x), etc.), the reciprocal function (1/x), square root, and/or reciprocal square root. In some embodiments, the function approximation unit may include an interpolator implemented using any suitable interpolation technique, including, without limitation, piecewise polynomial approximation, CORDIC, and/or symmetric bipartite tables. In some embodiments, the interpolator and/or any other suitable portion of the function approximation unit may be implemented using one or more two-operand adder structures and/or generate-add structures.

In some embodiments, one or more embedded multiplier blocks may be extended using one or more two-operand adder structures and/or generated-add structures to form a multiplier capable of multiplying larger operands.

In some embodiments, approximate arithmetic techniques may be used to eliminate one or more generate-add units and/or two-operand adders corresponding to the least-significant bits of a functional unit, to trade off reduced area, delay, and/or power for reduced accuracy. In some embodiments, constant and/or variable correction values may be calculated and added to the approximate arithmetic result to compensate for at least some of the reduced accuracy.

In some embodiments, two or more functional units comprising two-operand adder structures may be combined using merged arithmetic techniques.

In some embodiments, one or more operands of a functional unit may be signed and/or unsigned. In some embodiments, the operands of a functional unit may be encoded using any suitable technique, including, without limitation, two's complement encoding, one's complement encoding, unsigned encoding, sign and magnitude encoding, redundant encoding, and/or logarithmic number system (LNS) encoding.

In some embodiments, one or more multipliers including two-operand adder structures may replace one or more multipliers in existing FPGA designs.

In some embodiments, a two-operand adder structure (or structures incorporating one or more two-operand adder structures, including, but not limited to adders, multipliers, generate-add structures, FIR filters, IIR filters, structures configured to compute an FFT, structures configured to compute a DCT, structures configured to perform any other task or computation described in the present disclosure, and/or structures configured to perform any other suitable task or computation) may be packaged as an Intellectual Property (IP) building block, which may be licensed to end-users or included in a software tool that generates configurations for configurable systems, including, without limitation, a software tool that generates a hardware description (e.g., Verilog and/or VHDL code) for an FPGA system, and/or a software tool that configures an FPGA system to implement a hardware description (e.g., a software tool that places and routes a hardware description onto an FPGA system).

Figure 27:
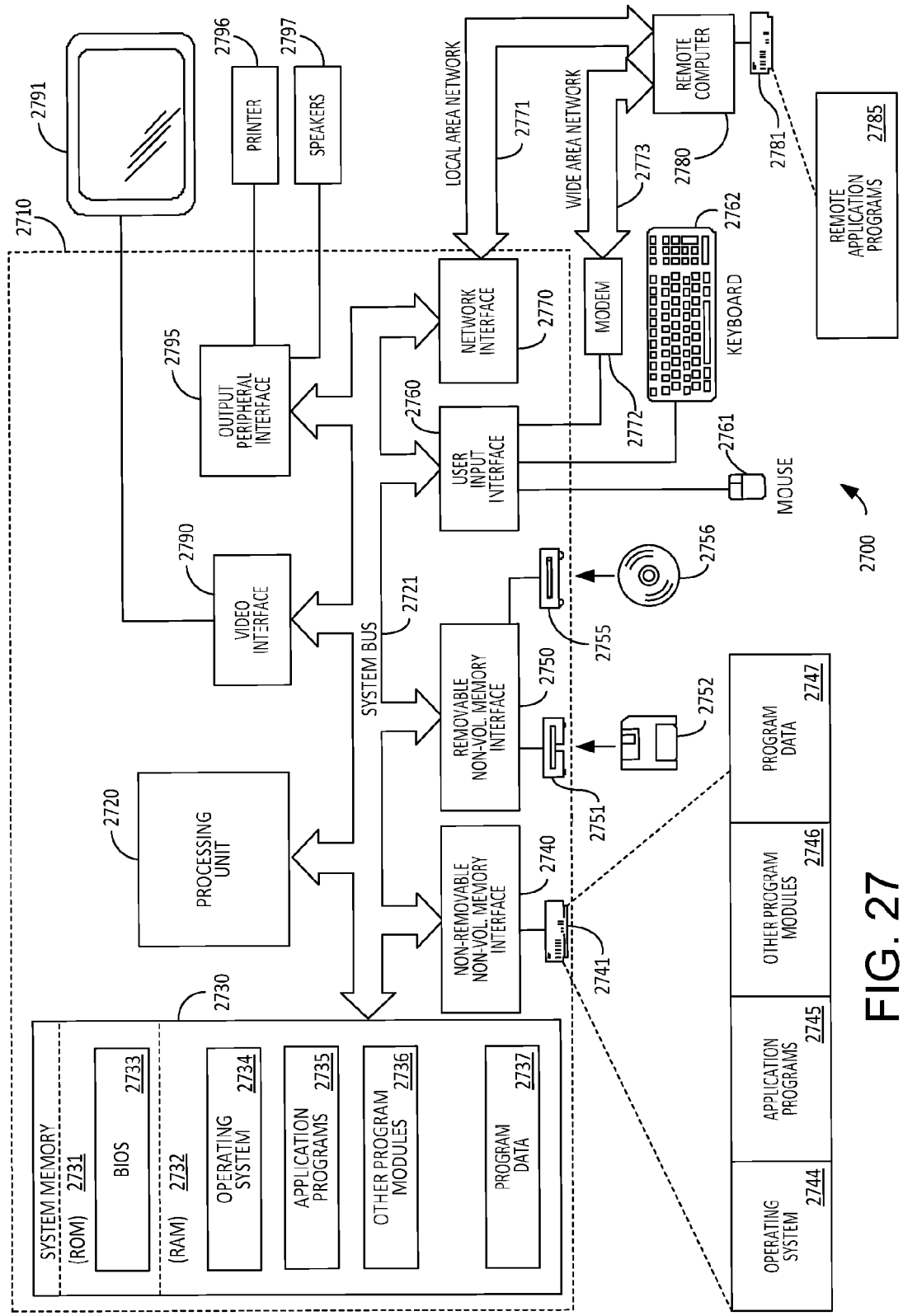
FIG. 27 is a block diagram of an exemplary computer system in which aspects of the present disclosure may be implemented, according to some embodiments.

FIG. 27 shows a block diagram of a computer system 2700 in which aspects of the present disclosure may be implemented, according to some embodiments. Computer system 2700 may be representative of a computing system suitable for implementing techniques described herein. In some embodiments, computer system 2700 may be configured to perform a method of generating a hardware description for a configurable system (e.g., an FPGA-based system), wherein the hardware description is suitable for configuring the configurable system to implement one or more embodiments of a two-operand adder structure. In some embodiments, computer system 2700 may be configured to perform a method of configuring a configurable system to implement one or more embodiments of a two-operand adder structure (e.g., a method of placing and routing a hardware description of one or more embodiments of a two-operand structure on the configurable system). In some embodiments, computer system 2700 may be configured to perform a method of simulating a configurable system, wherein simulating the configurable system includes modeling the operation of one or more embodiments of a two-operand adder structure.

However, it should be appreciated that computer system 2700 is only one example of a suitable computing environment and is not intended to suggest any limitation as to the scope of use or functionality of the described embodiments. Neither should computer system 2700 be interpreted as having any dependency or requirement relating to any one or combination of components illustrated in FIG. 27.

The embodiments are operational with numerous other general purpose or special purpose computing system environments or configurations. Examples of well-known computing systems, environments, and/or configurations that may be suitable for use with the described techniques include, but are not limited to, personal computers, server computers, hand-held or laptop devices, smart phones, wearable computers, multiprocessor systems, microprocessor-based systems, set top boxes, programmable consumer electronics, network PCs, minicomputers, mainframe computers, distributed computing environments that include any of the above systems or devices, and the like.

The computer system may execute computer-executable instructions, such as program modules. Generally, program modules include routines, programs, objects, components, data structures, etc., that perform particular tasks or implement particular abstract data types. The embodiments may also be practiced in distributed computing environments where tasks are performed by remote processing devices that are linked through a communications network. In a distributed computing environment, program modules may be located in local and/or remote computer storage media including memory storage devices.

With reference to FIG. 27, an exemplary system 2700 for implementing the described techniques includes a general purpose computing device in the form of a computer 2710. Components of computer 2710 may include, but are not limited to, a processing unit 2720, a system memory 2730, and a system bus 2721 that couples various system components including the system memory to the processing unit 2720. The system bus 2721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. In some embodiments, processing unit 2720 may include one or more processing devices, including, but not limited to, one or more central processing units (CPUs), graphics processing units (GPUs), field-programmable gate array (FPGAs), accelerators, and/or any other suitable devices (e.g., circuits) configured to process data.

Computer 2710 typically includes a variety of computer readable media. Computer readable media can be any available media that can be accessed by computer 2710 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, solid state drives, or any other medium which can be used to store the desired information and which can accessed by computer 2710. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 2730 may include computer storage media in the form of volatile and/or nonvolatile memory such as read only memory (ROM) 2731 and random access memory (RAM) 2732. A basic input/output system 2733 (BIOS), containing the basic routines that help to transfer information between elements within computer 2710, such as during start-up, is typically stored in ROM 2731. RAM 2732 typically contains data and/or program modules that are immediately accessible to and/or presently being operated on by processing unit 2720. By way of example, and not limitation, FIG. 27 illustrates operating system 2734, application programs 2735, other program modules 2736, and program data 2737.

The computer 2710 may include other removable/non-removable, volatile/nonvolatile computer storage media. By way of example only, FIG. 27 illustrates a hard disk drive 2741 that reads from and/or writes to non-removable, nonvolatile magnetic media, a magnetic disk drive 2751 that reads from and/or writes to a removable, nonvolatile magnetic disk 2752, and an optical disk drive 2755 that reads from and/or writes to a removable, nonvolatile optical disk 2756 such as a CD ROM or other optical media. Other removable/non-removable, volatile/nonvolatile computer storage media that can be used in the exemplary computer system include, but are not limited to, magnetic tape cassettes, flash memory cards, digital versatile disks, digital video tape, solid state RAM, solid state ROM, and the like. The hard disk drive 2741 is typically connected to the system bus 2721 through a non-removable memory interface such as interface 2740, and magnetic disk drive 2751 and optical disk drive 2755 are typically connected to the system bus 2721 by a removable memory interface, such as interface 2750.

The drives and their associated computer storage media discussed above and illustrated in FIG. 27 provide storage of computer readable instructions, data structures, program modules and other data for the computer 2710. In FIG. 27, for example, hard disk drive 2741 is illustrated as storing operating system 2744, application programs 2745, other program modules 2746, and program data 2747. Note that these components can either be the same as or different from operating system 2734, application programs 2735, other program modules 2736, and program data 2737. Operating system 2744, application programs 2745, other program modules 2746, and program data 2747 are given different numbers here to illustrate that, at a minimum, they are different copies. A user may enter commands and information into the computer 2710 through input devices such as a keyboard 2762 and pointing device 2761, commonly referred to as a mouse, trackball or touch pad. Other input devices (not shown) may include a microphone, joystick, game pad, satellite dish, scanner, touchscreen, or the like. These and other input devices are often connected to the processing unit 2720 through a user input interface 2760 that is coupled to the system bus, but may be connected by other interface and bus structures, such as a parallel port, game port or a universal serial bus (USB). A monitor 2791 or other type of display device is also connected to the system bus 2721 via an interface, such as a video interface 2790. In addition to the monitor, computers may also include other peripheral output devices such as speakers 2797 and printer 2796, which may be connected through an output peripheral interface 2795.

The computer 2710 may operate in a networked environment using logical connections to one or more remote computers, such as a remote computer 2780. The remote computer 2780 may be a personal computer, a server, a router, a network PC, a peer device or other common network node, and typically includes many or all of the elements described above relative to the computer 2710, although only a memory storage device 2781 has been illustrated in FIG. 27. The logical connections depicted in FIG. 27 include a local area network (LAN) 2771 and a wide area network (WAN) 2773, but may also include other networks. Such networking environments are commonplace in offices, enterprise-wide computer networks, intranets and the Internet.

When used in a LAN networking environment, the computer 2710 is connected to the LAN 2771 through a network interface or adapter 2770. When used in a WAN networking environment, the computer 2710 typically includes a modem 2772 or other means for establishing communications over the WAN 2773, such as the Internet. The modem 2772, which may be internal or external, may be connected to the system bus 2721 via the user input interface 2760, or other appropriate mechanism. In a networked environment, program modules depicted relative to the computer 2710, or portions thereof, may be stored in the remote memory storage device. By way of example, and not limitation, FIG. 27 illustrates remote application programs 2785 as residing on memory device 2781. It will be appreciated that the network connections shown are exemplary and other means of establishing a communications link between the computers may be used.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation comprises at least one processor-readable storage medium (i.e., at least one tangible, non-transitory processor-readable medium, e.g., a computer memory (e.g., hard drive, flash memory, processor working memory, etc.), a floppy disk, an optical disc, a magnetic tape, or other tangible, non-transitory processor-readable medium) encoded with a computer program (i.e., a plurality of instructions), which, when executed on one or more processors, performs at least the above-discussed methods and/or operations. The processor-readable storage medium can be transportable such that the program stored thereon can be loaded onto any computer resource to implement functionality discussed herein. In addition, it should be appreciated that the reference to a computer program which, when executed, performs above-discussed functions, is not limited to an application program running on a host computer. Rather, the term "computer program" is used herein in a generic sense to reference any type of computer code (e.g., software or microcode) that can be employed to program one or more processors to implement above-discussed methods and/or operations.

In some embodiments, computer system 2700 may be communicatively coupled to one or more programmable logic devices (e.g., FPGAs) via any suitable interface, including, without limitation, output peripheral interface 2795 and/or network interface 2720. In some embodiments, computer system 2700 may be configured to configure the one or more programmable logic devices (e.g., FPGAs) to implement embodiments of circuits described herein and/or any other suitable circuits.

It should be understood that the various embodiments shown in the Figures are illustrative representations, and are not necessarily drawn to scale. Reference throughout the specification to "one embodiment" or "an embodiment" or "some embodiments" means that a particular feature, structure, material, or characteristic described in connection with the embodiment(s) is included in at least one embodiment, but not necessarily in all embodiments. Consequently, appearances of the phrases "in one embodiment," "in an embodiment," or "in some embodiments" in various places throughout the Specification are not necessarily referring to the same embodiment.

Unless the context clearly requires otherwise, throughout the disclosure, the words "comprise," "comprising," and the like are to be construed in an inclusive sense as opposed to an exclusive or exhaustive sense; that is to say, in a sense of "including, but not limited to." Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list; all of the items in the list; and any combination of the items in the list.

Having thus described several aspects of at least one embodiment of the technology, it is to be appreciated that various alterations, modifications, and improvements will readily occur to those skilled in the art. Such alterations, modifications, and improvements are intended to be within the spirit and scope of the technology. Accordingly, the foregoing description and drawings provide non-limiting examples only.

What is claimed is:

1. A device, comprising:
a producer circuit configured to:
  receive a plurality of bits encoding a bit of a first addend,
  receive a bit of a second addend,
  produce, using the plurality of bits encoding the bit of the first addend, a bit of the first addend,
  provide, at a first output, a result equal to an exclusive-OR of the produced bit of the first addend and the bit of the second addend, and
  provide, at a second output, the produced bit of the first addend or the bit of the second addend; and
an adder circuit having a first input coupled to the first output of the producer circuit, having a second input coupled to the second output of the producer circuit, having a third input coupled to receive a carry-in bit, and configured to provide a result equal to a sum of the produced bit of the first addend, the bit of the second addend, and the carry-in bit.

2. The device of claim 1, wherein the producer circuit includes:
a first programmable logic circuit (PLC) having an output configured to provide the produced bit of the first addend;
a second programmable logic circuit (PLC) having an output configured to provide an inverse of the produced bit of the first addend; and
a first selection circuit having a first data input coupled to the output of the first PLC, a second data input coupled to the output of the second PLC, a control input coupled to receive the bit of the second addend, and an output configured to provide the result equal to the exclusive-OR of the produced bit of the first addend and the bit of the second addend.

3. The device of claim 2, wherein the adder circuit includes:
a second selection circuit having a first data input coupled to the output of the first PLC, a second data input coupled to receive the carry-in bit, a control input coupled to the output of first selection circuit, and an output configured to provide a result equal to a carry-out bit of a sum of the produced bit of the first addend, the bit of the second addend, and the carry-in bit; and
a sum-bit circuit having a first input coupled to the output of the first selection circuit, a second input coupled to receive the carry-in bit, and an output configured to provide a result equal to a sum bit of the sum of the produced bit of the first addend, the bit of the second addend, and the carry-in bit.

4. The device of claim 1, wherein the device is implemented on a field-programmable gate array (FPGA).

5. A two-operand adder circuit, comprising:
a first programmable logic circuit (PLC) receiving a plurality of bits encoding a bit of a first addend and generating an output configured to provide a bit of the first addend;
a second programmable logic circuit (PLC) receiving the plurality of bits encoding the bit of the first addend and generating an output configured to provide an inverse of the bit of the first addend;
a first selection circuit having a first data input coupled to the generated output of the first PLC, a second data input coupled to the generated output of the second PLC, a control input coupled to receive a bit of a second addend, and an output configured to provide a result equal to an exclusive-OR of the generated bit of the first addend and the bit of the second addend;

a second selection circuit having a first data input coupled to the generated output of the first PLC, a second data input coupled to receive a carry-in bit, a control input coupled to the output of first selection circuit, and an output configured to provide a result equal to a carry-out bit of a sum of the generated bit of the first addend, the bit of the second addend, and the carry-in bit; and a sum-bit circuit having a first input coupled to the output of the first selection circuit, a second input coupled to receive the carry-in bit, and an output configured to provide a result equal to a sum bit of a sum of the generated bit of the first addend, the bit of the second addend, and the carry-in bit.

6. The two-operand adder circuit of claim 5, wherein inputs of the first PLC are coupled to respective inputs of the second PLC.

7. The two-operand adder circuit of claim 6, wherein the first PLC comprises a five-input lookup table (LUT), and wherein the second PLC comprises a five-input lookup table (LUT).

8. The two-operand adder circuit of claim 6, wherein the inputs of the first and second PLCs are coupled to receive one or more bits of a first operand of a multiplication operation and one or more bits of a second operand of a multiplication operation.

9. The two-operand adder circuit of claim 5, wherein:
the two-operand adder circuit comprises a third programmable logic circuit (PLC),
the third PLC includes: the first PLC, the second PLC, and the first selection circuit,
a first output of the third PLC is coupled to the output of the first selection circuit,
a second output of the third PLC is coupled to the output of the first PLC,
first inputs of the third PLC are coupled to respective inputs of the first PLC and to respective inputs of the second PLC, and
a second input of the third PLC is coupled to the control input of the first selection circuit.

10. The two-operand adder circuit of claim 9, wherein the first PLC, the second PLC, and the first selection circuit are configured to operate as a six-input lookup table (LUT).

11. The two-operand adder circuit of claim 5, wherein the first selection circuit comprises a multiplexer.

12. The two-operand adder circuit of claim 5, wherein the second selection circuit comprises a multiplexer.

13. The two-operand adder circuit of claim 5, wherein the sum-bit circuit comprises an exclusive-OR gate.

14. The two-operand adder circuit of claim 5, further comprising a third selection circuit having a first data input coupled to the output of the first PLC, a second data input, a control input, and an output coupled to the first data input of the second selection circuit.

15. The two-operand adder circuit of claim 14, wherein the third selection circuit comprises a multiplexer.

16. The two-operand adder circuit of claim 14, wherein the second data input of the third selection circuit is coupled to receive the bit of the second addend.

17. The two-operand adder circuit of claim 5, wherein:
the first addend comprises a first partial product, and
the second addend comprises a second partial product.

18. The two-operand adder circuit of claim 17, wherein:
the first partial product comprises a partial product of a radix-4 modified-Booth multiplication operation, and
the second partial product comprises a partial product of a radix-4 modified-Booth multiplication operation.

19. The two-operand adder circuit of claim 17, further comprising a fourth programmable logic circuit (PLC) configured to provide the bit of the second addend at an output of the fourth PLC, wherein the control input of the first selection circuit is coupled to the output of the fourth PLC.

20. A field-programmable gate array (FPGA) comprising the two-operand adder circuit of claim 5.

21. A device, comprising:
a first and a second two-operand adder circuit, each comprising;
a first programmable logic circuit (PLC) receiving a plurality of bits encoding a bit of a first addend and generating an output configured to provide a bit of the first addend;
a second programmable logic circuit (PLC) receiving the plurality of bits encoding the bit of the first addend and generating an output configured to provide an inverse of the bit of the first addend;
a first selection circuit having a first data input coupled to the generated output of the first PLC, a second data input coupled to the generated output of the second PLC, a control input coupled to receive a bit of a second addend, and an output configured to provide a result equal to an exclusive-OR of the generated bit of the first addend and the bit of the second addend;
a second selection circuit having a first data input coupled to the generated output of the first PLC, a second data input coupled to receive a carry-in bit, a control input coupled to the output of first selection circuit, and an output configured to provide a result equal to a carry-out bit of a sum of the generated bit of the first addend, the bit of the second addend, and the carry-in bit; and
a sum-bit circuit having a first input coupled to the output of the first selection circuit, a second input coupled to receive the carry-in bit, and an output configured to provide a result equal to a sum bit of a sum of the generated bit of the first addend, the bit of the second addend, and the carry-in bit;
wherein the second data input of the second selection circuit of the second two-operand adder circuit is coupled to the output of the second selection circuit of the first two-operand adder circuit.

22. The device of claim 21, wherein the device is a field programmable gate array.

* * * * *